US012590872B2

(12) United States Patent
Lee et al.

(10) Patent No.: US 12,590,872 B2
(45) Date of Patent: Mar. 31, 2026

(54) JIG FOR TESTING FLEXIBLE PANEL AND DISPLAY DEVICE INCLUDING THE SAME

(71) Applicant: Samsung Display Co., LTD., Yongin-si (KR)

(72) Inventors: Jung Il Lee, Yongin-si (KR); Sang Wol Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 438 days.

(21) Appl. No.: 18/100,725

(22) Filed: Jan. 24, 2023

(65) Prior Publication Data

US 2023/0358653 A1     Nov. 9, 2023

(30) Foreign Application Priority Data

May 4, 2022     (KR) ........................ 10-2022-0055529

(51) Int. Cl.
*G01N 3/02*     (2006.01)
*G06F 1/16*     (2006.01)

(52) U.S. Cl.
CPC ............. *G01N 3/02* (2013.01); *G06F 1/1652* (2013.01); *G06F 1/1681* (2013.01)

(58) Field of Classification Search
CPC ....................................................... G01N 3/02
USPC ........................................................ 73/849
See application file for complete search history.

(56) References Cited

U.S. PATENT DOCUMENTS

| | | | |
|---|---|---|---|
| 2019/0320048 A1* | 10/2019 | Yang ...................... | G06F 1/1652 |
| 2022/0217228 A1* | 7/2022 | Hu ......................... | G06F 1/1652 |
| 2023/0053947 A1* | 2/2023 | Liu ........................ | G06F 1/1652 |
| 2023/0236098 A1* | 7/2023 | Lee .......................... | G01N 3/20 |
| 2023/0279898 A1* | 9/2023 | Liu ...................... | H05K 5/0226 |
| | | | 361/807 |
| 2024/0028079 A1* | 1/2024 | Chen ..................... | G06F 1/1652 |
| 2024/0155788 A1* | 5/2024 | Huang ................ | H04M 1/0268 |

FOREIGN PATENT DOCUMENTS

| | | |
|---|---|---|
| CN | 109979328 | 7/2019 |
| KR | 10-2014-0014669 | 2/2014 |
| KR | 10-2016-0083608 | 7/2016 |

* cited by examiner

*Primary Examiner* — Walter L Lindsay, Jr.
*Assistant Examiner* — Philip T Fadul
(74) *Attorney, Agent, or Firm* — Lerner David LLP

(57)     ABSTRACT

A jig for testing a flexible panel includes first and second flat panel frames, and a first hinge part between the first flat panel frame and the second flat panel frame to allow the first flat panel frame and the second flat panel frame to be subjected to folding. The first hinge part includes a first gear arm, a second gear arm engaged with the first gear arm, and a first gear housing covering at least a portion of the first gear arm and at least a portion of the second gear arm. A panel exposing area concavely bent toward the inside of the first gear housing may be defined in the first gear housing, and in case that the first flat panel frame and the second flat panel frame are folded, the panel exposing area of the first gear housing exposes a side of the display member.

20 Claims, 32 Drawing Sheets

150: 150_1, 150_2
170: 170_1, 170_2, GP

150: 150_1, 150_2
170: 170_1, 170_2, GP

DR3
DR1
DR2

110: 110a, 110b
130: 130a, 130b
170: 170_1, 170_2, GP
170_1: 170_1a, 170_1b, 170_1c
170_2: 170_2a, 170_2b, 170_2c
GP1: GH1, G1, G2, SG

DR3

DR1 ⊙ → DR2

150: 150_1, 150_2
150_1: 150_1a, 150_1b, 150_1c
150_2: 150_2a, 150_2b, 150_2c

110: 110a, 110b, 110c
130: 130a, 130b, 130c
150: 150_1, 150_2

MP: MP_1, SLP_1, SMP_1
150_1: 150_1a, 150_1c

DR3

DR2

DR1

MP: SMP_1
150_1: 150_1a

MP: SMP_1, LP1, SMP2
150_1: 150_1a, 150_1b
150_2: 150_2a, 150_2b

JIG FOR TESTING FLEXIBLE PANEL AND DISPLAY DEVICE INCLUDING THE SAME

CROSS-REFERENCE TO RELATED APPLICATION(S)

This application claims priority to and benefits of Korean Patent Application No. 10-2022-0055529 under 35 U.S.C. § 119, filed on May 4, 2022 in the Korean Intellectual Property Office, the entire contents of which are herein incorporated by reference.

BACKGROUND

1. Technical Field

The disclosure relates to a device and a jig for testing a flexible panel of a display device.

2. Description of the Related Art

With the advancement of multimedia, importance of a display device has been enhanced. Accordingly, various types of display devices such as an organic light emitting display device and a liquid crystal display device have been used.

Recently, with the development of display technology, research and development on a display device having a flexible display is actively ongoing. The flexible display may extend or reduce a display screen in such a way of folding, bending or sliding of the display screen, thereby significantly contributing to decrease in volume or change in design of the display device.

SUMMARY

An aspect of the disclosure is to provide a jig capable of readily testing bending characteristics of a flexible panel.

Another aspect of the disclosure is to provide a display device that ensures reliability in bending characteristics of a flexible panel.

The aspects of the disclosure are not limited to those mentioned above and additional aspects of the disclosure, which are not mentioned herein, will be clearly understood by those skilled in the art from the following description of the disclosure.

According to an embodiment of the disclosure, a jig may be provided for testing a flexible panel, disposed on a bottom surface of a display member to test bending characteristics of the display member. The jig may include a first flat panel frame, a second flat panel frame disposed on a side of the first flat panel frame, and a first hinge part disposed between the first flat panel frame and the second flat panel frame to allow the first flat panel frame and the second flat panel frame to be subjected to folding. The first hinge part may include a first gear arm attached to the first flat panel frame, a second gear arm engaged with the first gear arm and attached to the second flat panel frame, and a first gear housing covering at least a portion of the first gear arm and at least a portion of the second gear arm. A panel exposing area concavely bent toward an inside of the first gear housing may be defined in the first gear housing. In case that the first flat panel frame and the second flat panel frame are folded, the panel exposing area of the first gear housing may expose a side of the display member.

In an embodiment, the display member may include a display panel that displays a screen, and the display panel may include a first non-bending area disposed on the first flat panel frame, a second non-bending area disposed on the second flat panel frame, and a first bending area disposed between the first non-bending area and the second non-bending area. In case that the first flat panel frame and the second flat panel frame are folded, the panel exposing area of the first gear housing may expose the first bending area of the display panel.

In an embodiment, the display member may further include a panel support disposed on a bottom surface of the display panel. The panel support may include a first flat panel portion that overlaps the first non-bending area of the display panel, a second flat panel portion that overlaps the second non-bending area, and a first main lattice pattern portion that overlaps the first bending area of the display panel. In case that the first flat panel frame and the second flat panel frame are folded, the panel exposure area of the first gear housing may expose the first main lattice pattern portion of the panel support.

In an embodiment, the first gear arm may include a first flat portion attached to an upper surface of the first flat panel frame, a first inclined portion disposed on a side of the first flat portion and inclined toward a bottom surface of the first flat panel frame based on the first flat portion, and a first sawtooth portion disposed on one side of the first inclined portion and accommodated in the first gear housing. The second gear arm may include a second flat portion attached to an upper surface of the second flat panel frame, a second inclined portion disposed on one side of the second flat portion and inclined toward a bottom surface of the second flat panel frame based on the second flat portion, and a second sawtooth portion disposed on one side of the second inclined portion and accommodated in the first gear housing. The first sawtooth portion and the second sawtooth portion may be engaged with each other inside the first gear housing.

In an embodiment, in case that the first flat panel frame and the second flat panel frame are folded, a gap distance between the first inclined portion of the first gear arm and the second inclined portion of the second gear arm may be greater than a gap distance between the first flat portion of the first gear arm and the second flat portion of the second gear arm.

In an embodiment, in case that the first flat panel frame and the second flat panel frame are folded, the gap distance between the first inclined portion of the first gear arm and the second inclined portion of the second gear arm may be increased in a direction toward the first gear housing.

In an embodiment, the first gear arm may include first dumbbells disposed on the first flat portion and spaced apart from each other, and the second gear arm may include second dumbbells disposed on the second flat portion and spaced apart from each other.

In an embodiment, first grooves concavely recessed in a thickness direction of the first flat portion may be defined in the first flat portion as gap spaces of the first dumbbells, and second grooves concavely recessed in a thickness direction of the second flat portion may be defined in the second flat portion as gap spaces of the second dumbbells.

In an embodiment, in case that the first flat panel frame and the second flat panel frame are folded, each of the first dumbbells may be accommodated in each of the second grooves, and each of the second dumbbells may be accommodated in each of the first grooves.

In an embodiment, a jig may further comprise, a third flat panel frame disposed on an opposite side of the first flat panel frame with the second flat panel frame interposed therebetween, and a second hinge part disposed between the second flat panel frame and the third flat panel frame to allow the second flat panel frame and the third flat panel frame to be subjected to folding. The second hinge part may include a third gear arm attached to the second flat panel frame, a fourth gear arm engaged with the third gear arm and attached to the third flat panel frame, and a second gear housing covering at least a portion of the third gear arm and at least a portion of the fourth gear arm.

In an embodiment, a panel exposing area concavely bent toward an inside of the second gear housing may be defined in the second gear housing, and in case that the second flat panel frame and the third flat panel frame are folded, the panel exposing area of the second gear housing may expose a side of the display member.

In an embodiment, the second gear housing may cover the side of the display member in case that the second flat panel frame and the third flat panel frame are folded, and a gap distance between the first flat panel frame and the second flat panel frame in case that the first flat panel frame and the second flat panel frame are folded may be smaller than a gap distance between the second flat panel frame and the third flat panel frame in case that the second flat panel frame and the third flat panel frame are folded.

According to an embodiment of the disclosure, a display device may include a display member, a jig supporting a bottom surface of the display member, folded in a first direction, and a set cover member covering the display member and the jig so that a side of the display member and the jig may not be visible from the outside. The jig may include a first flat panel frame, a second flat panel frame disposed to be spaced apart from the first flat panel frame on a side of the first flat panel frame in the first direction, and a hinge part disposed between an end of the first flat panel frame in a second direction crossing the first direction and an end of the second flat panel frame in the second direction to allow the first flat panel frame and the second flat panel frame to be subjected to folding. The hinge part may include a first gear arm attached to the first flat panel frame, a second gear arm engaged with the first gear arm and attached to the second flat panel frame, and a gear housing covering at least a portion of the first gear arm and at least a portion of the second gear arm. A panel exposing area concavely bent toward the inside of the gear housing may be defined in the gear housing, and the jig may expose the side of the display member through the panel exposing area in case that the first flat panel frame and the second flat panel frame are folded.

In an embodiment, the display device may further comprise a wing plate member disposed in a gap space between the first flat panel frame and the second flat panel frame, wherein the wing plate member may include a first wing plate connected to the first flat panel frame through a first rotation shaft passing through the first flat panel frame, and a second wing plate connected to the second flat panel frame through a second rotation shaft passing through the second flat panel frame. In case that the first flat panel frame and the second flat panel frame are folded, the first wing plate and the second wing plate may be widened so that a gap space between the first wing plate and the second wing plate may be increased in a direction toward the gear housing.

In an embodiment, the display member may include a display panel that displays a screen, and a metal support disposed on a bottom surface of the display panel. The metal support may include a first flat panel portion disposed on the first flat panel frame, a first main lattice pattern portion disposed on the wing plate member, and a second flat panel portion disposed on the second flat panel frame. The first flat panel portion may be attached to the first flat panel frame through an adhesive member, the second flat panel portion may be attached to the second flat panel frame through an adhesive member, and the first main lattice pattern portion may be spaced apart from the wing plate member.

In an embodiment, the metal support of the display member may further include a first sub-lattice pattern portion disposed between the first flat panel portion and the first main lattice pattern portion, and a first sub-flat panel portion disposed between the first sub-lattice pattern portion and the first main lattice pattern portion, the first wing plate may include a first rotation area through which the first rotation shaft passes, a first area that overlaps the first sub-flat panel portion, and a second area that overlaps the first main lattice pattern portion. The first sub-lattice pattern portion may overlap the first rotation area and may be attached to the first rotation area through an adhesive member, the first sub-flat panel portion may be attached to the first area through an adhesive member, and the first main lattice pattern portion may be spaced apart from the second area.

In an embodiment, the metal support of the display member may include a second sub-lattice pattern portion disposed between the second flat panel portion and the first main lattice pattern portion, and a second sub-flat panel portion disposed between the second sub-lattice pattern portion and the first main lattice pattern portion. The second wing plate may include a second rotation area through which the second rotation shaft passes, a third area that overlaps the second sub-flat panel portion, and a fourth area that overlaps the first main lattice pattern portion. The second sub-lattice pattern portion may overlap the second rotation area, and may be attached to the second rotation area through an adhesive member, the second sub-flat panel portion may be attached to the third area through an adhesive member, and the first main lattice pattern portion may be spaced apart from the fourth area.

In an embodiment, a width of the first sub-lattice pattern portion and a width of the second sub-lattice pattern portion may be smaller than a width of the first main lattice pattern portion, a width of the first sub-flat panel portion may be smaller than a width of the first flat panel portion, and a width of the second sub-flat panel portion may be smaller than a width of the second flat panel portion.

In an embodiment, the width of the first sub-lattice pattern portion and the width of the second sub-lattice pattern portion may be substantially the same as each other, and the width of the first sub-flat panel portion and the width of the second sub-flat panel portion may be substantially the same as each other.

In an embodiment, in case that the first flat panel frame and the second flat panel frame are folded, the first sub-lattice pattern portion and the second sub-lattice pattern portion may be bent in a direction toward the outside of the jig, and the first main lattice pattern portion may be bent in a direction toward the inside of the jig.

The jig according to an embodiment of the disclosure may readily test bending characteristics of the flexible panel.

The device according to an embodiment of the disclosure may ensure reliability in bending characteristics of the flexible panel.

The effects according to the embodiments of the disclosure are not limited to those mentioned above and more various effects are included in the following description of the disclosure.

BRIEF DESCRIPTION OF THE DRAWINGS

The above and other aspects and features of the disclosure will become more apparent by describing in detail embodiments thereof with reference to the attached drawings, in which:

5

6

Figure 1:
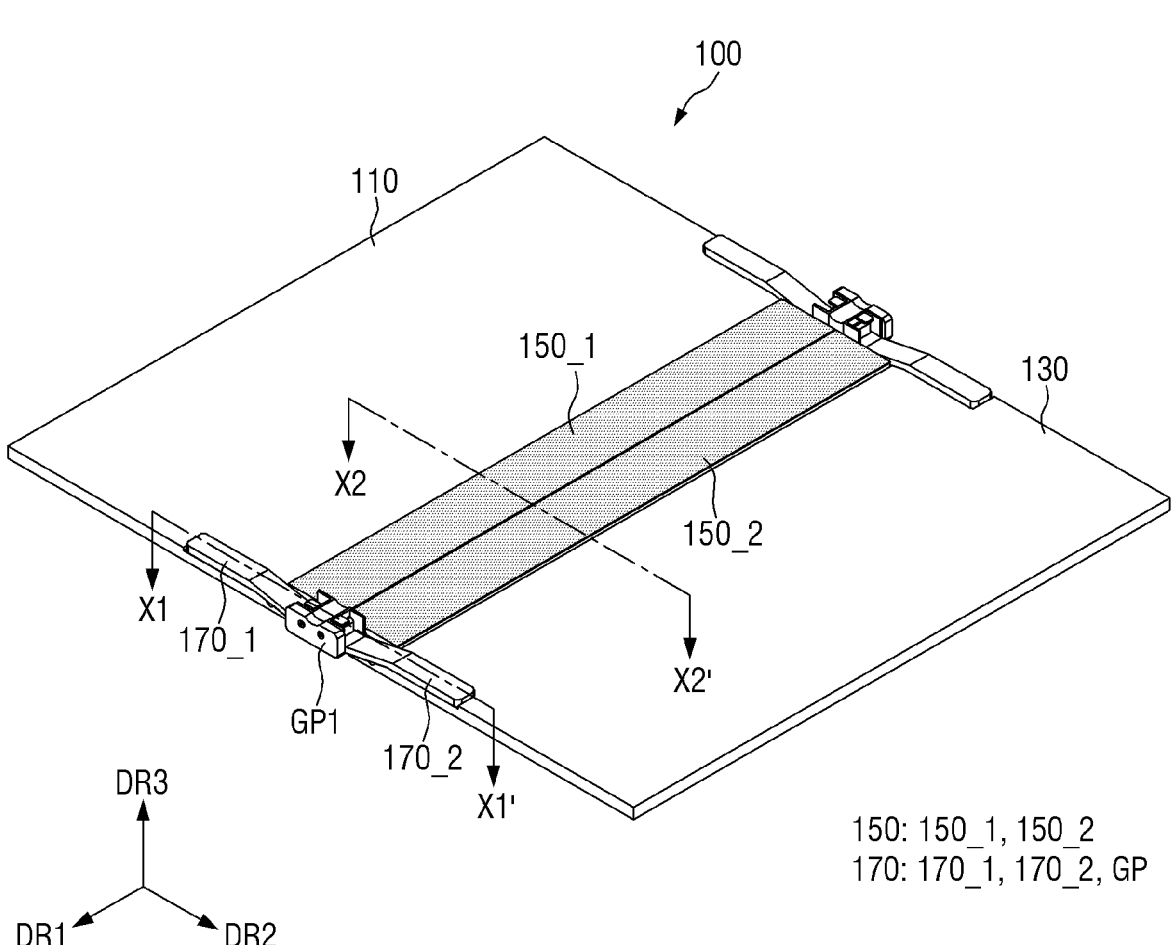
Figure 2:
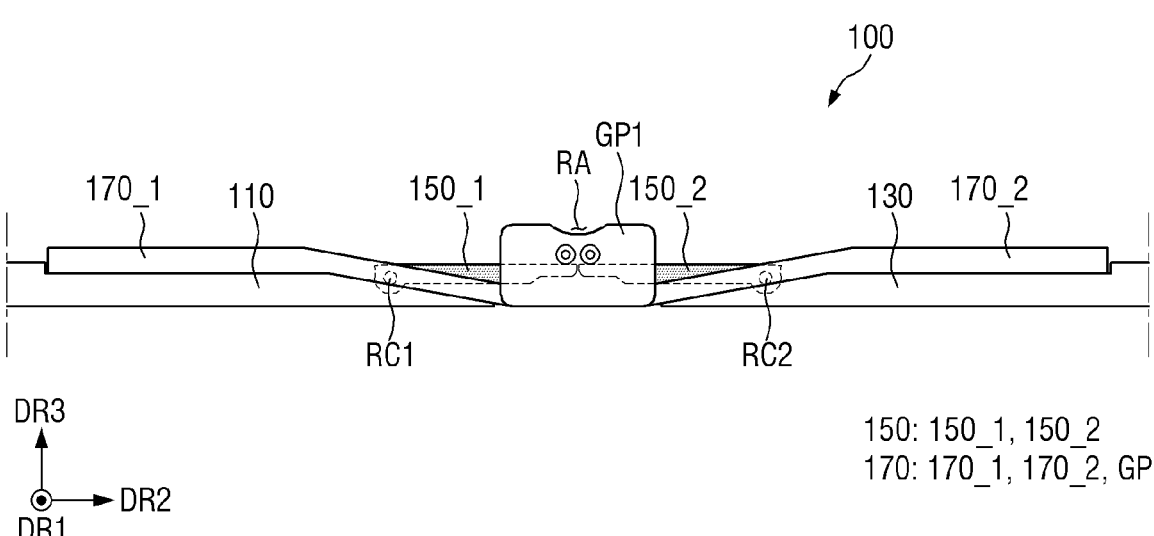
Figure 3:
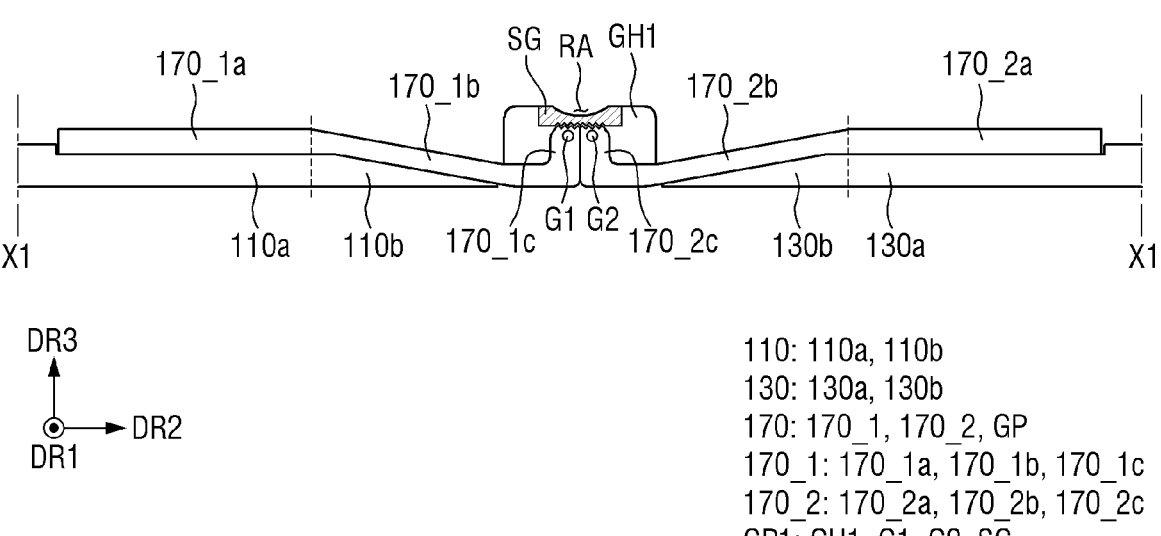
Figure 4:
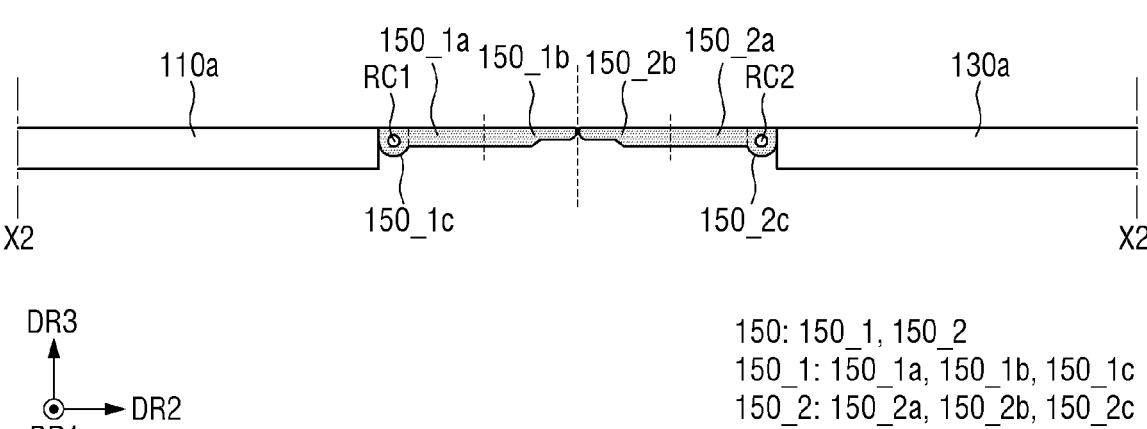
Figure 5:
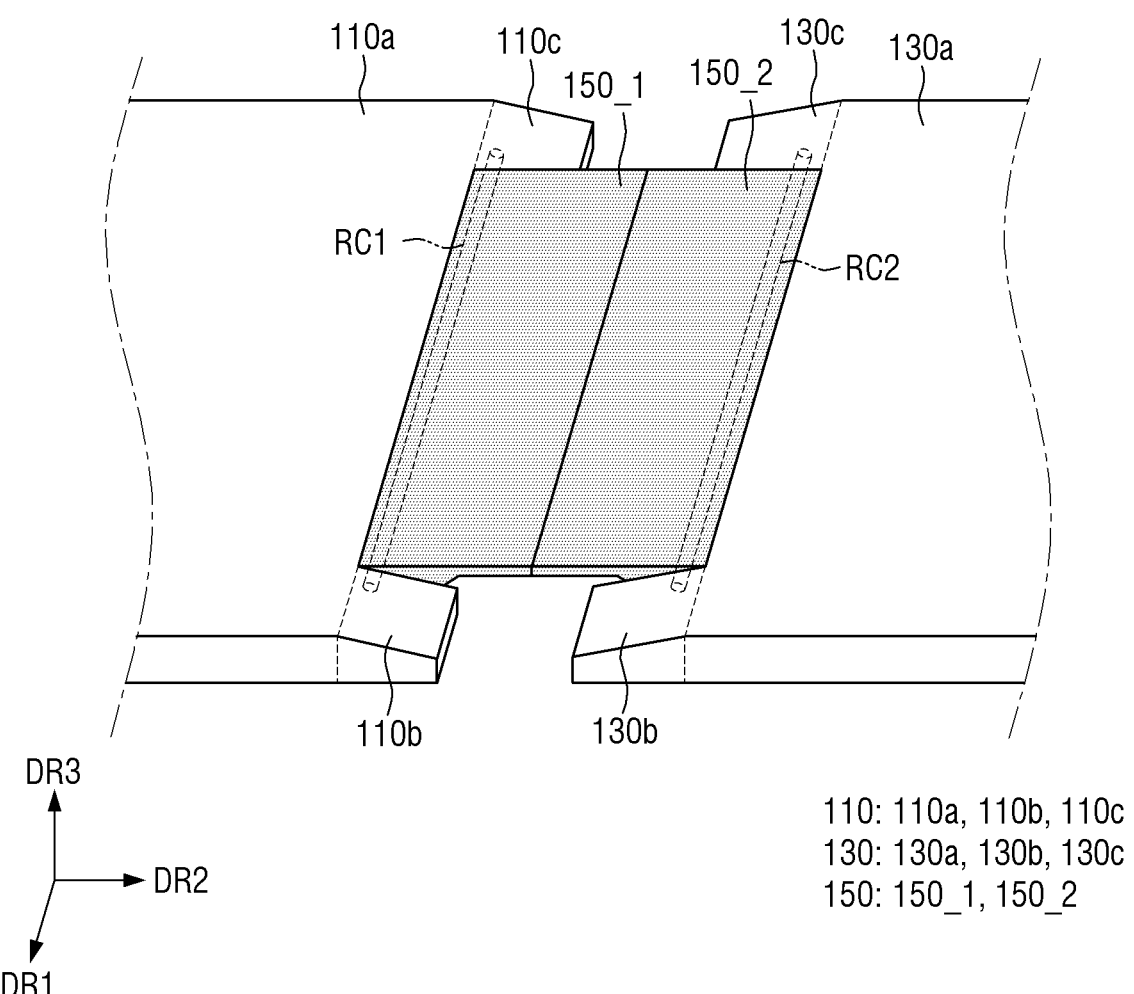
Figure 6:
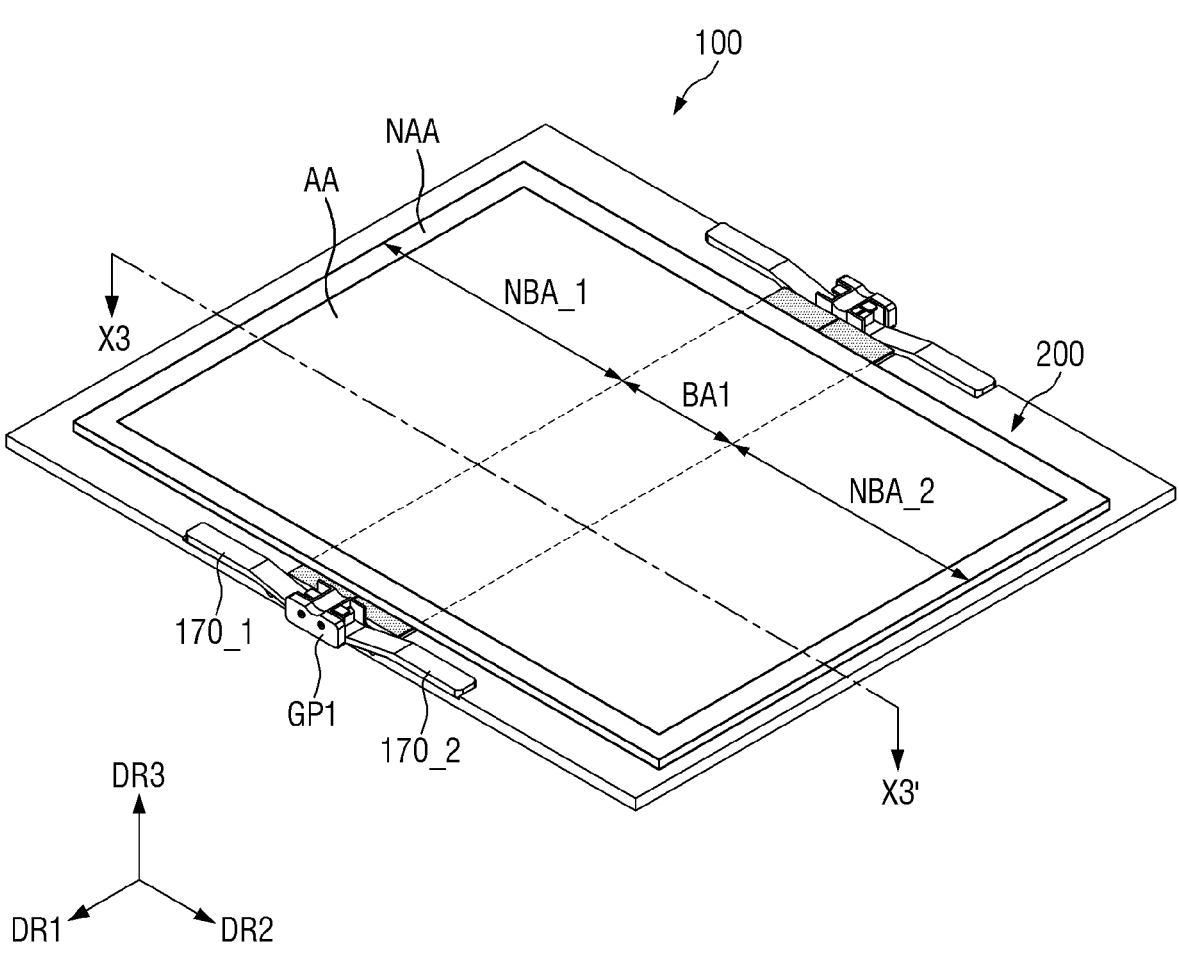
Figure 7:
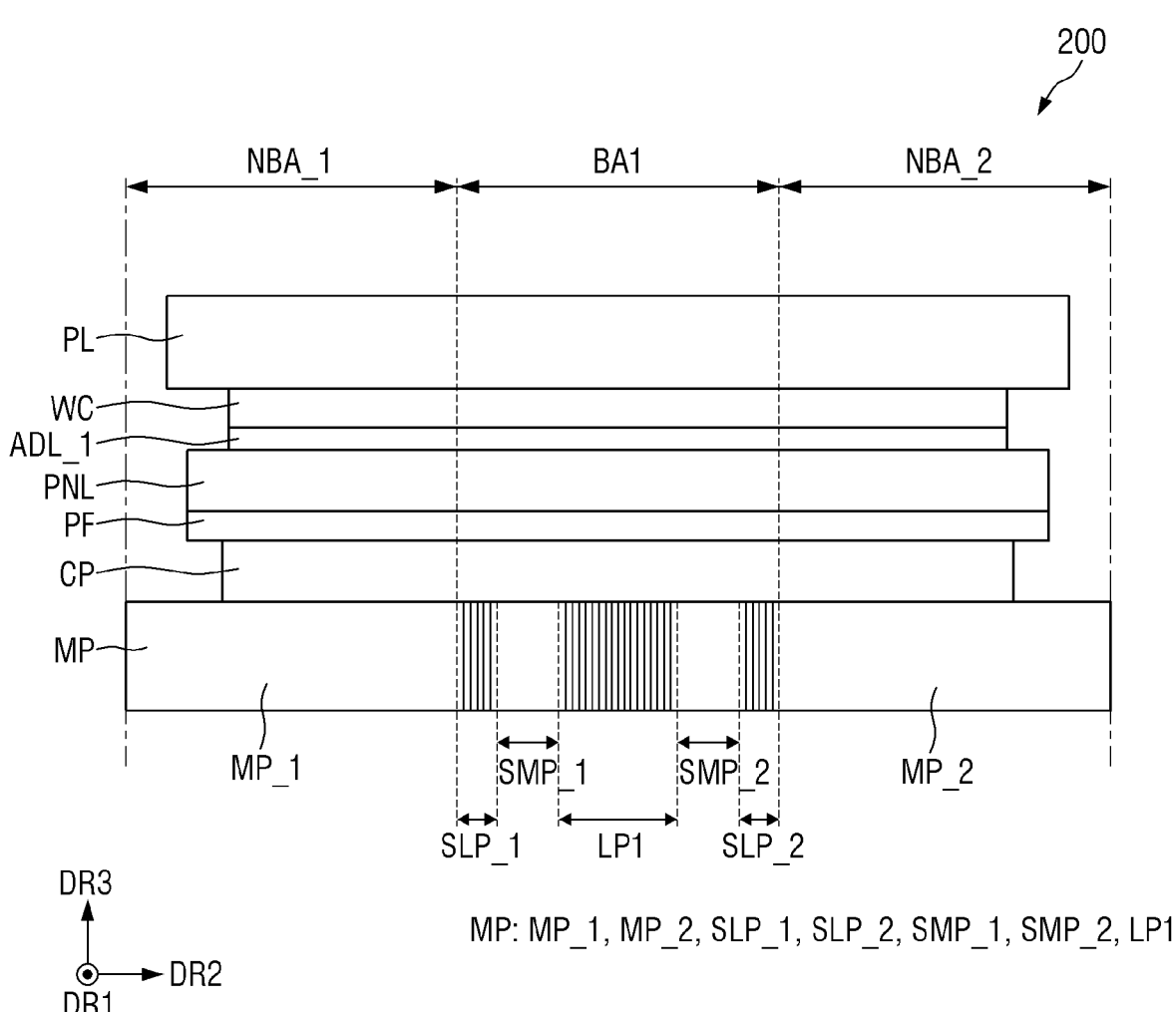
Figure 8:
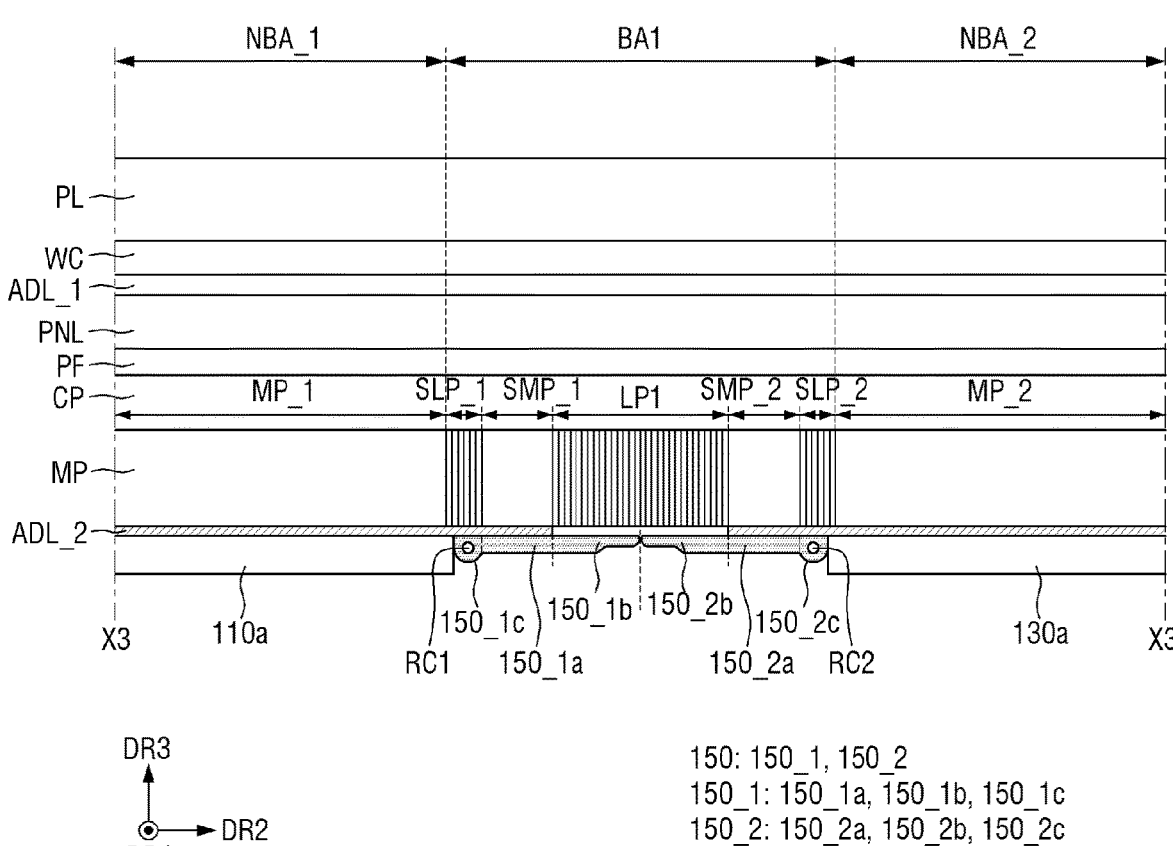
Figure 9:
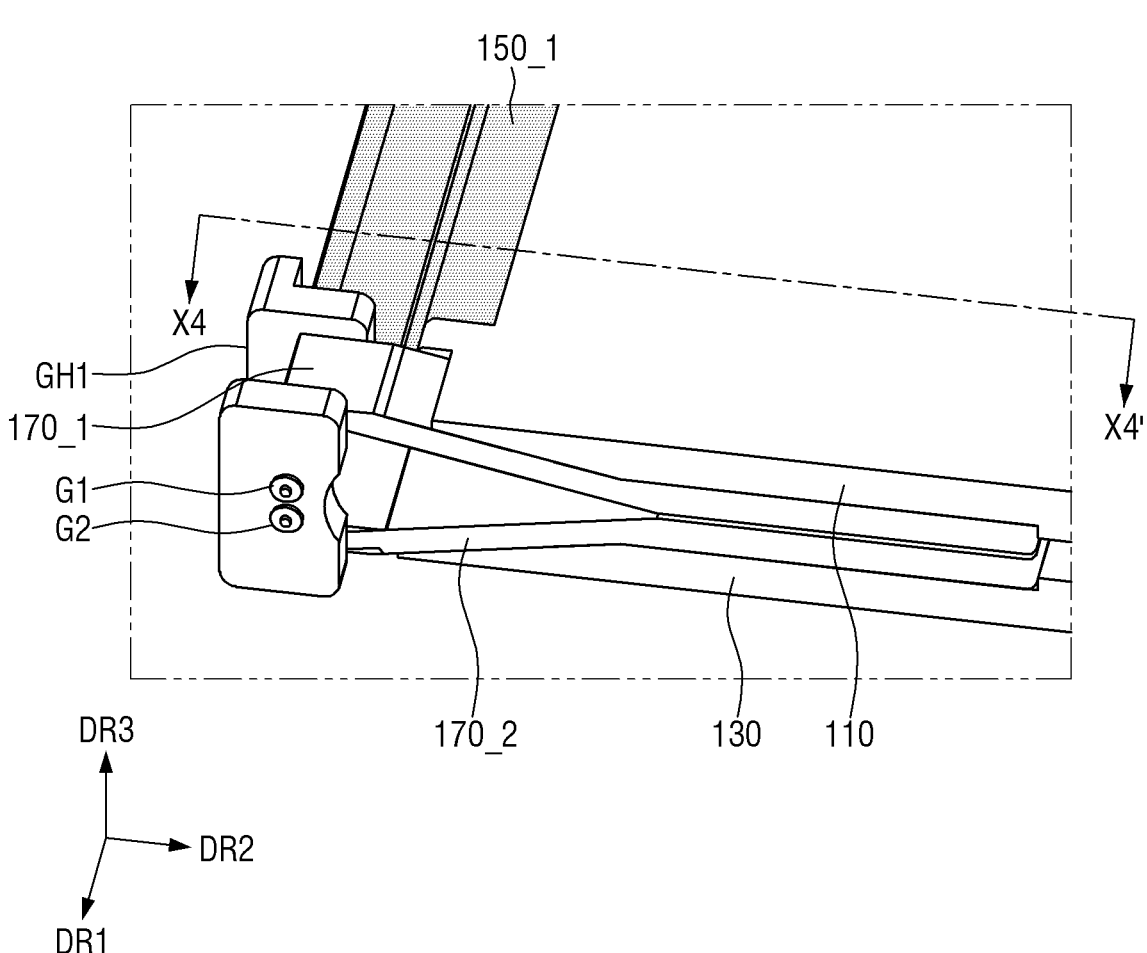
Figure 10:
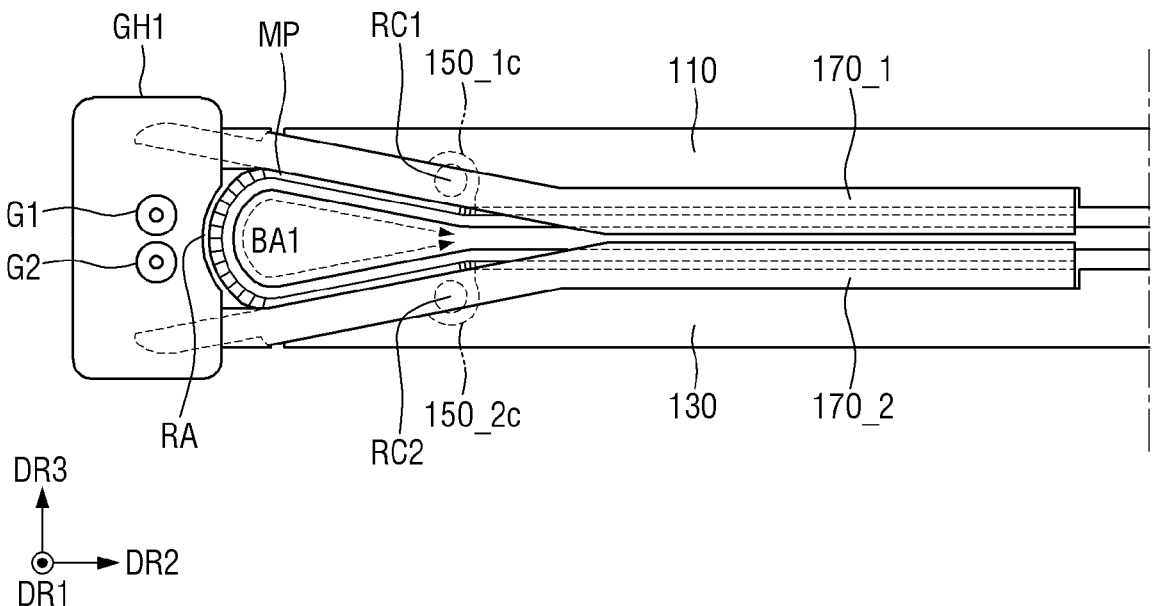
Figure 11:
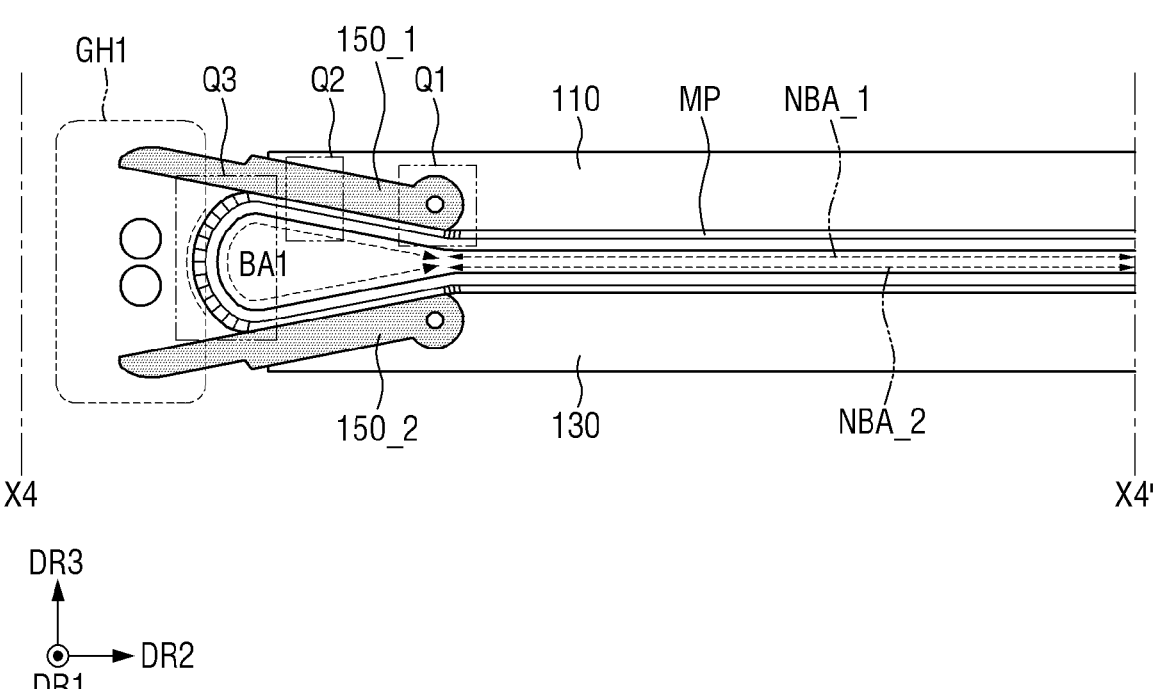
Figure 12:
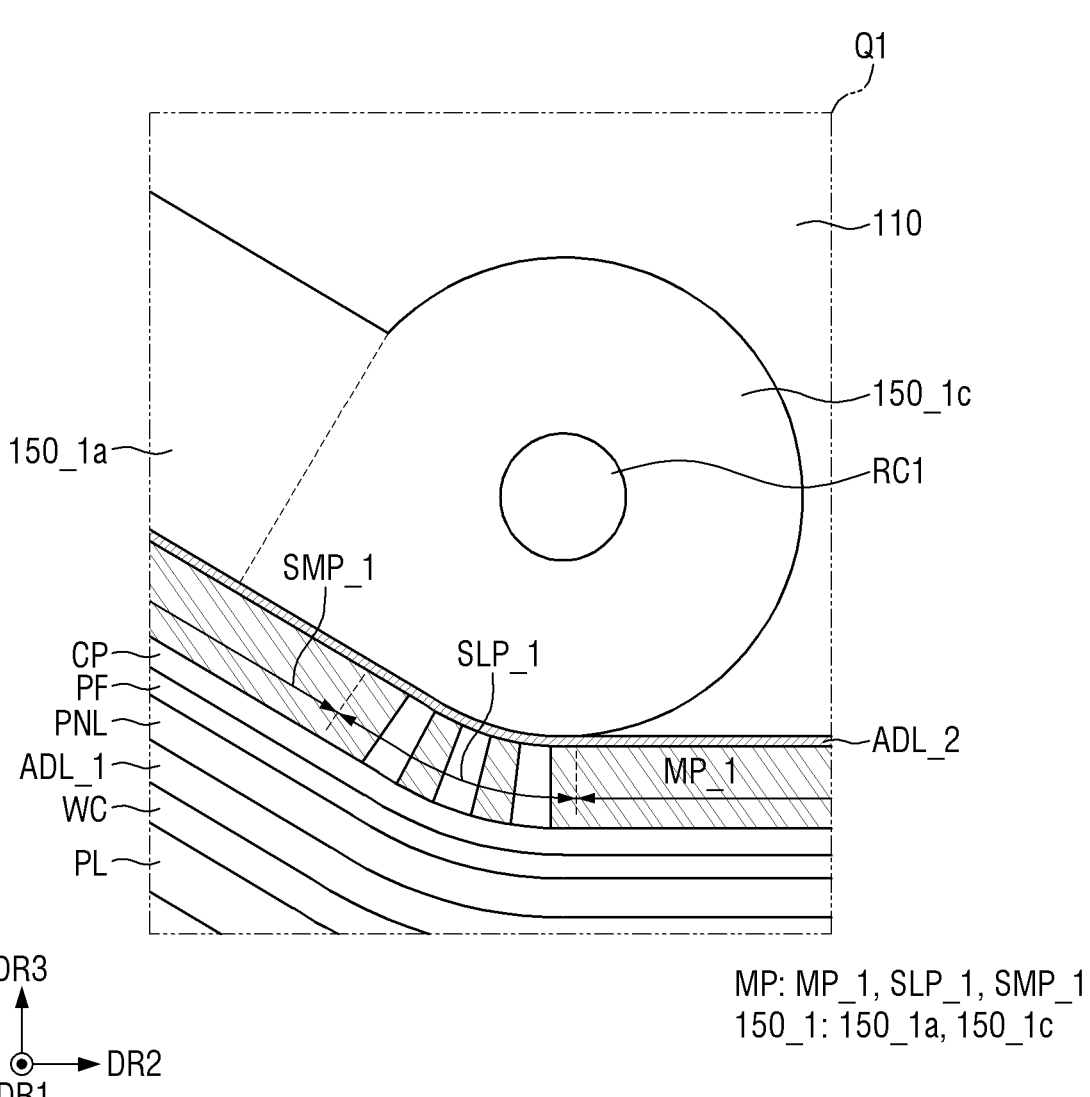
Figure 13:
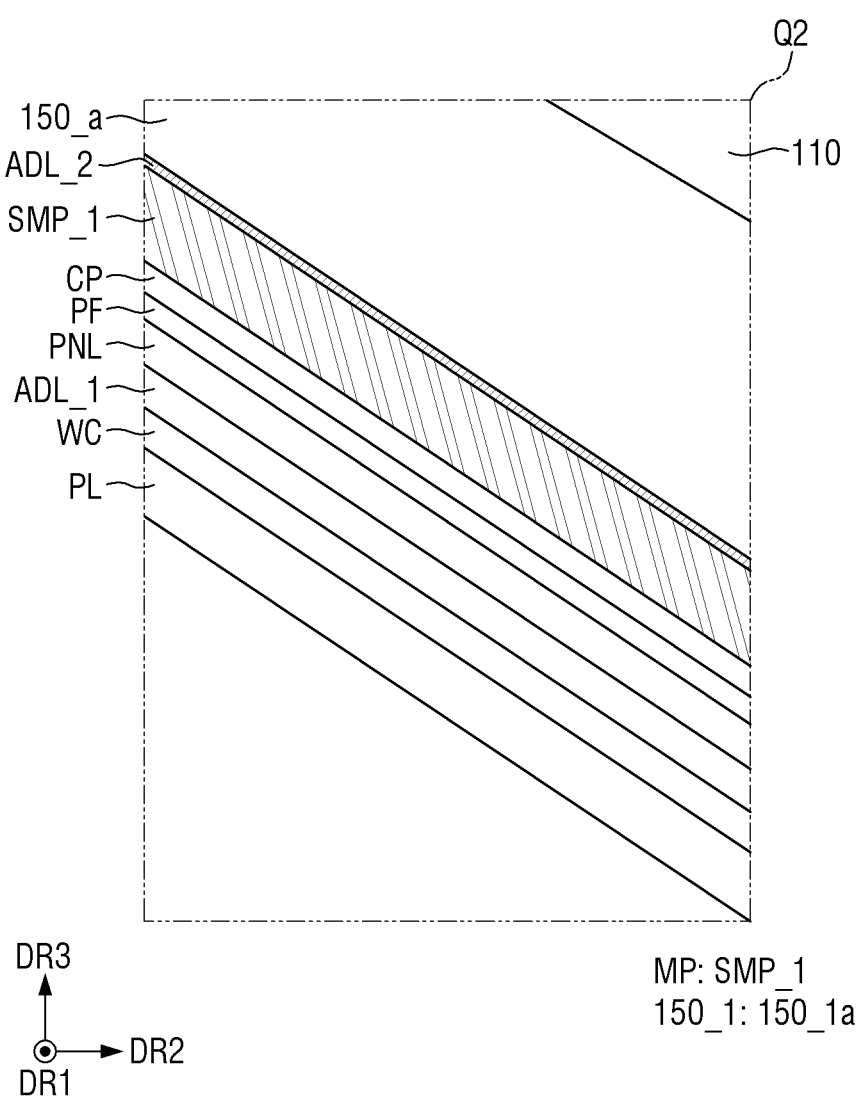
Figure 14:
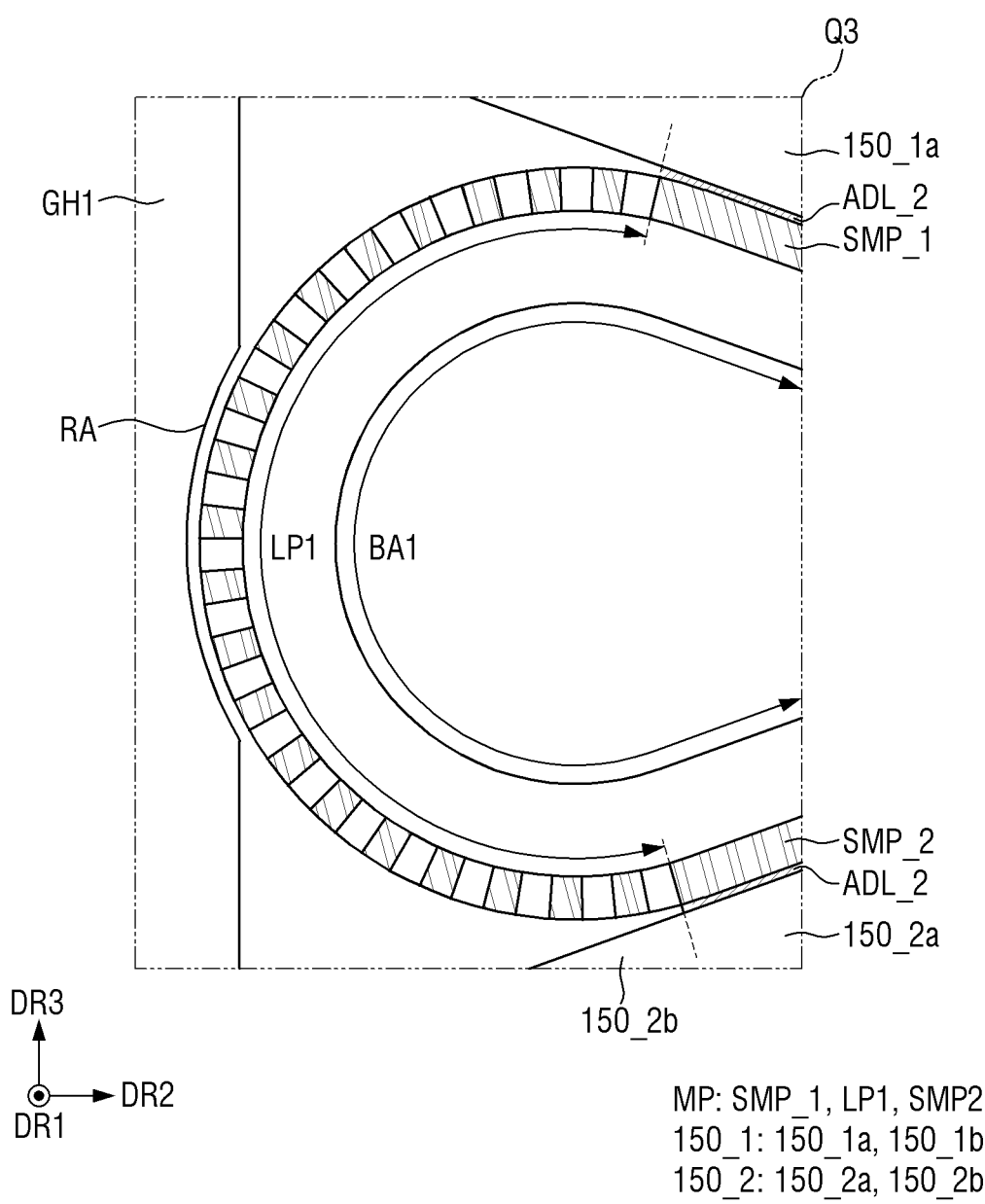
Figure 16:
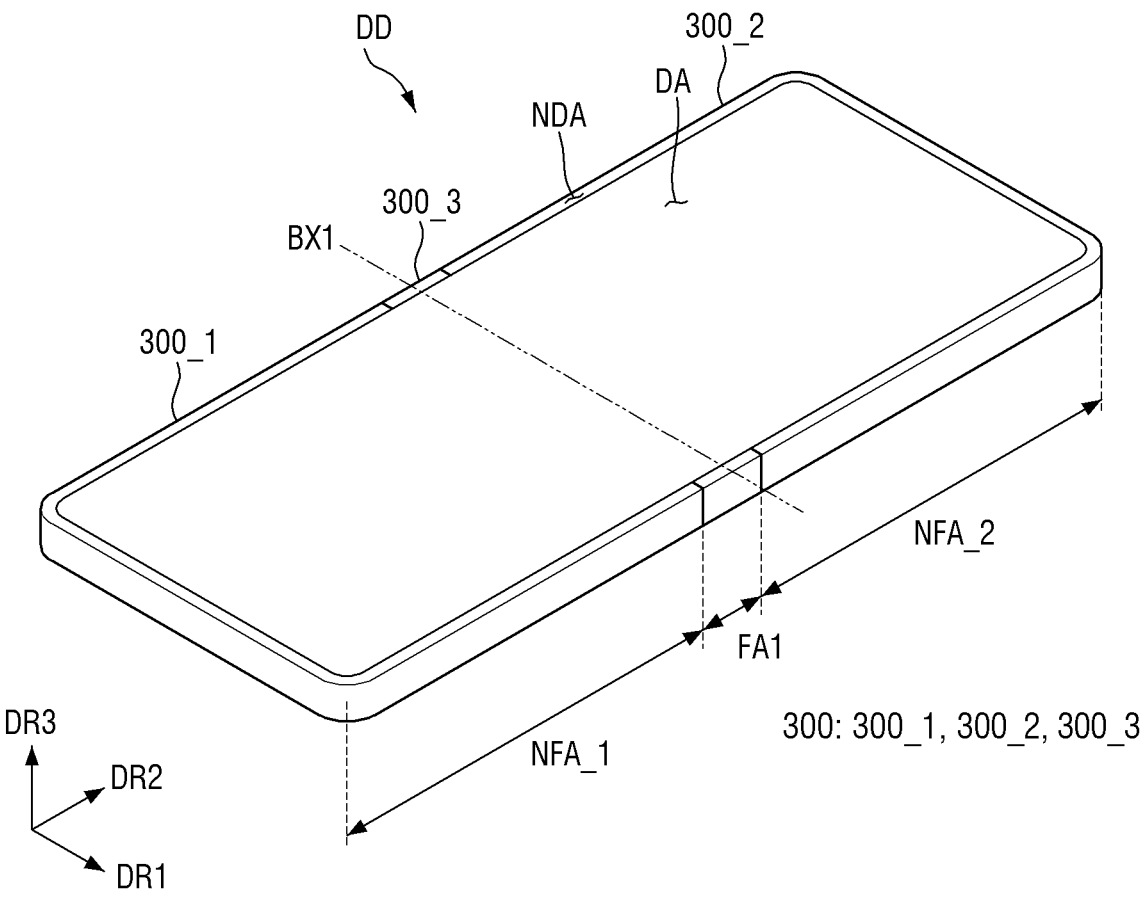
Figure 17:
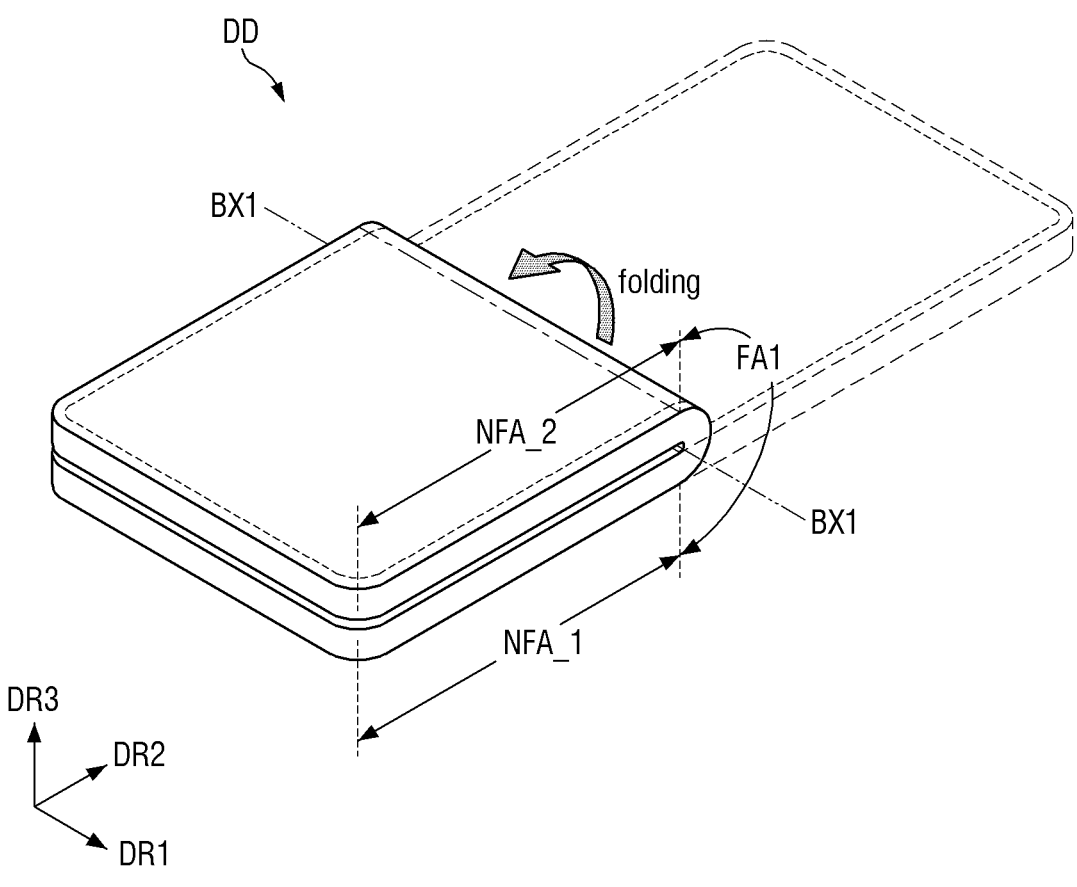
Figure 18:
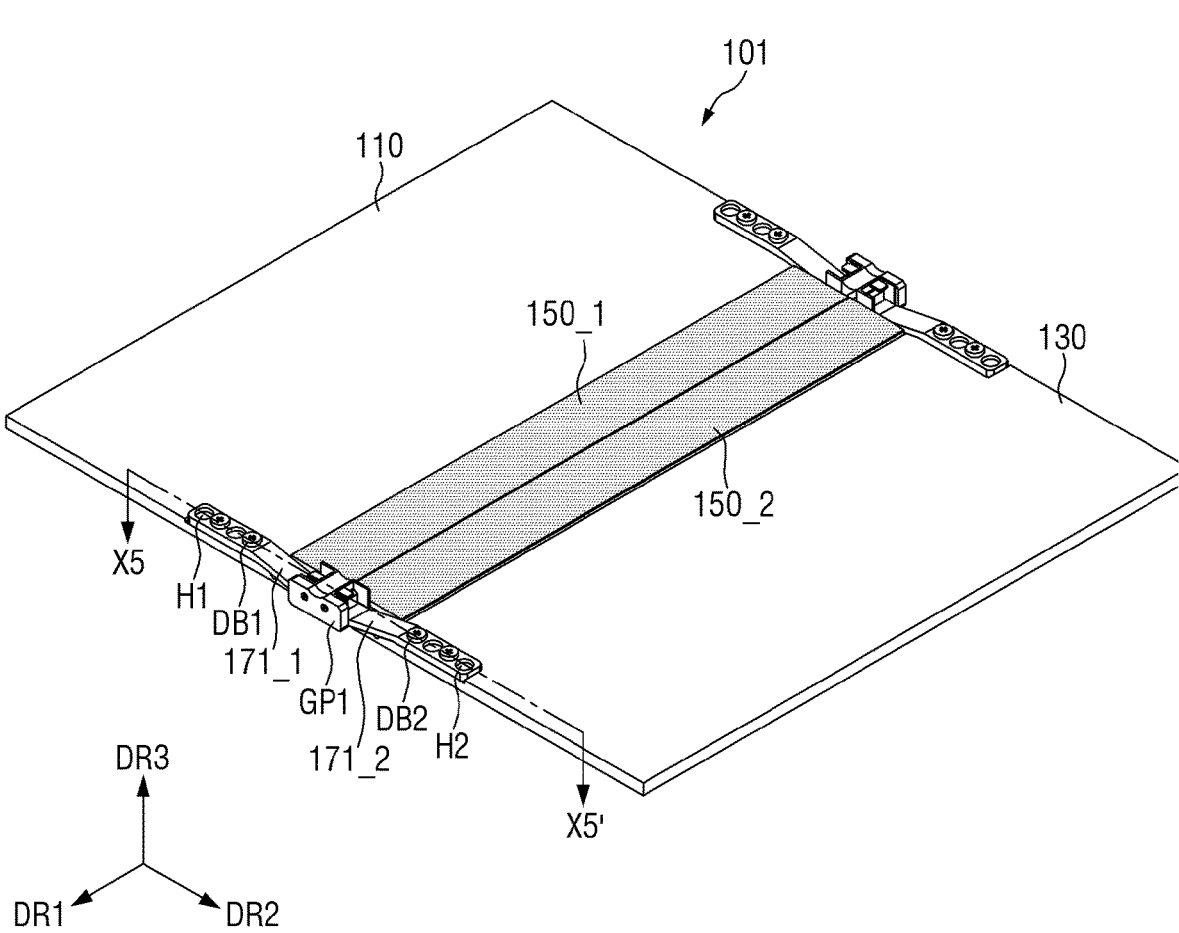
Figure 19:
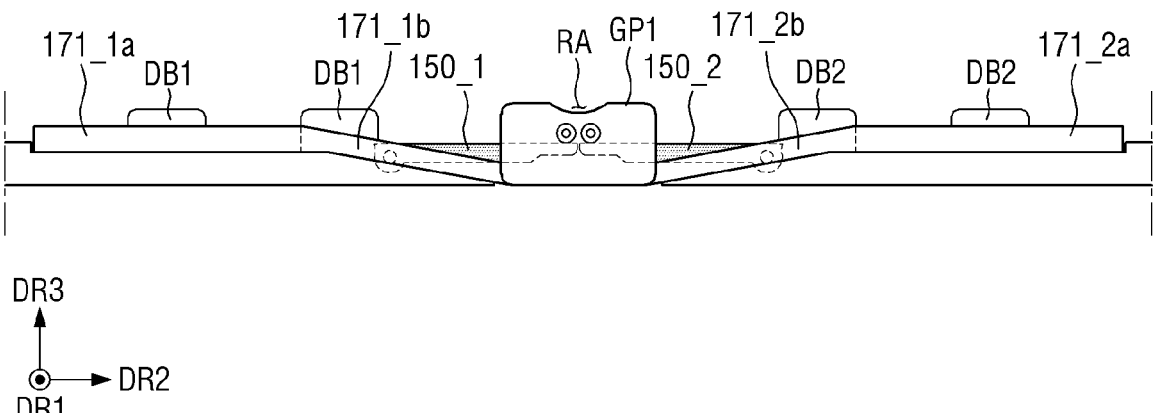
Figure 20:
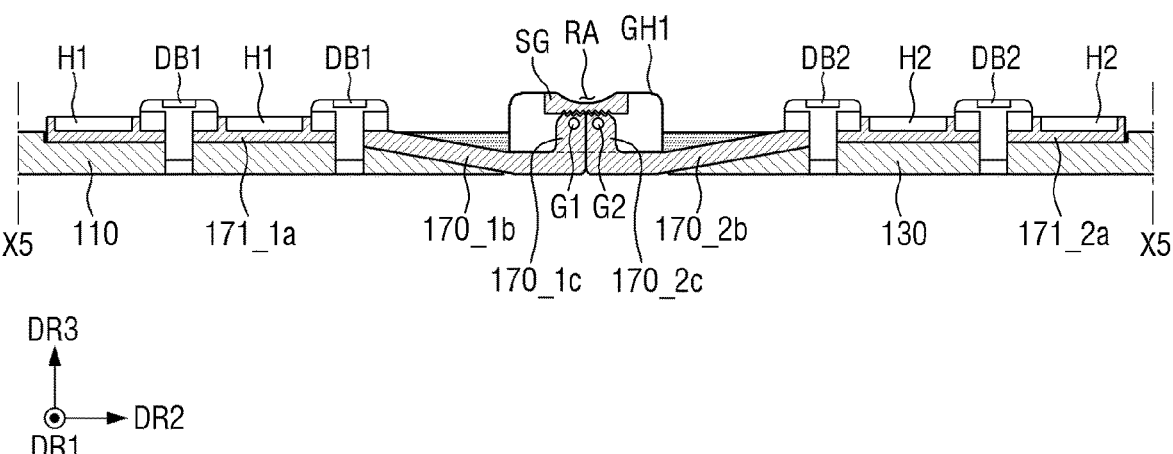
Figure 21:
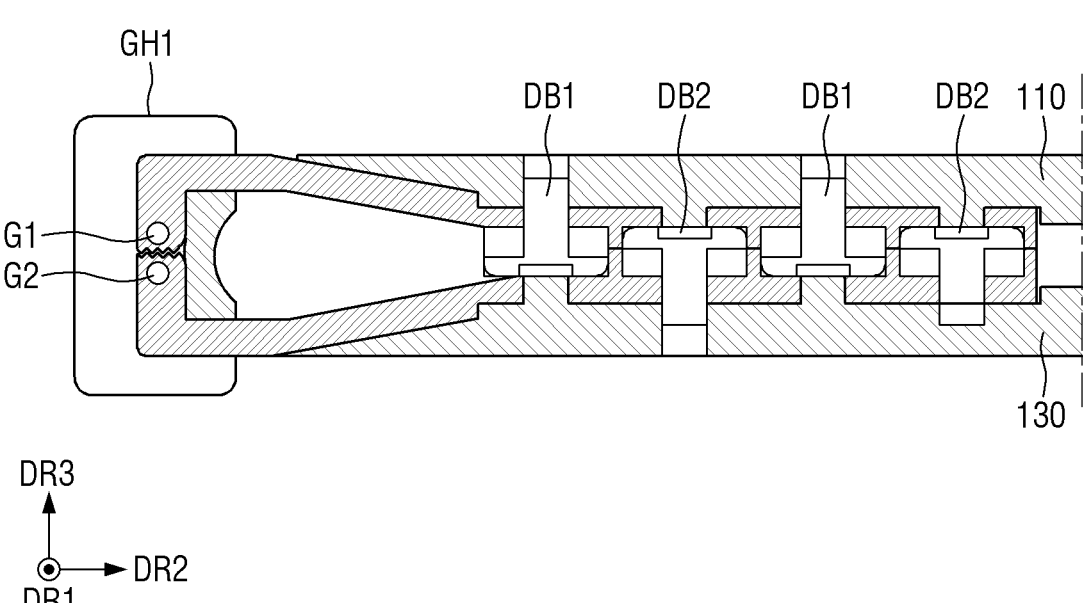
Figure 24:
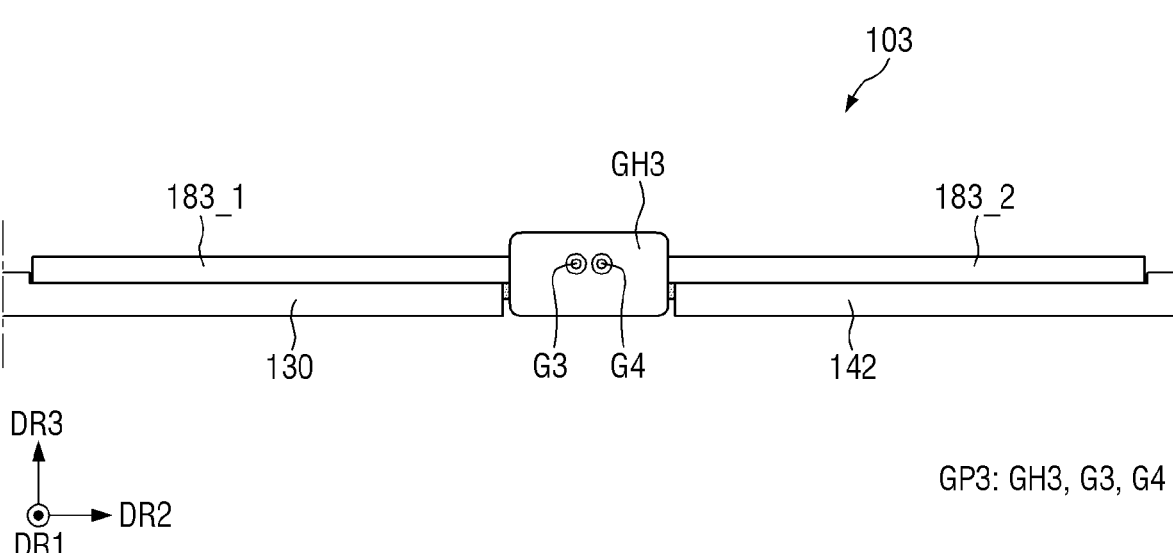
Figure 26:
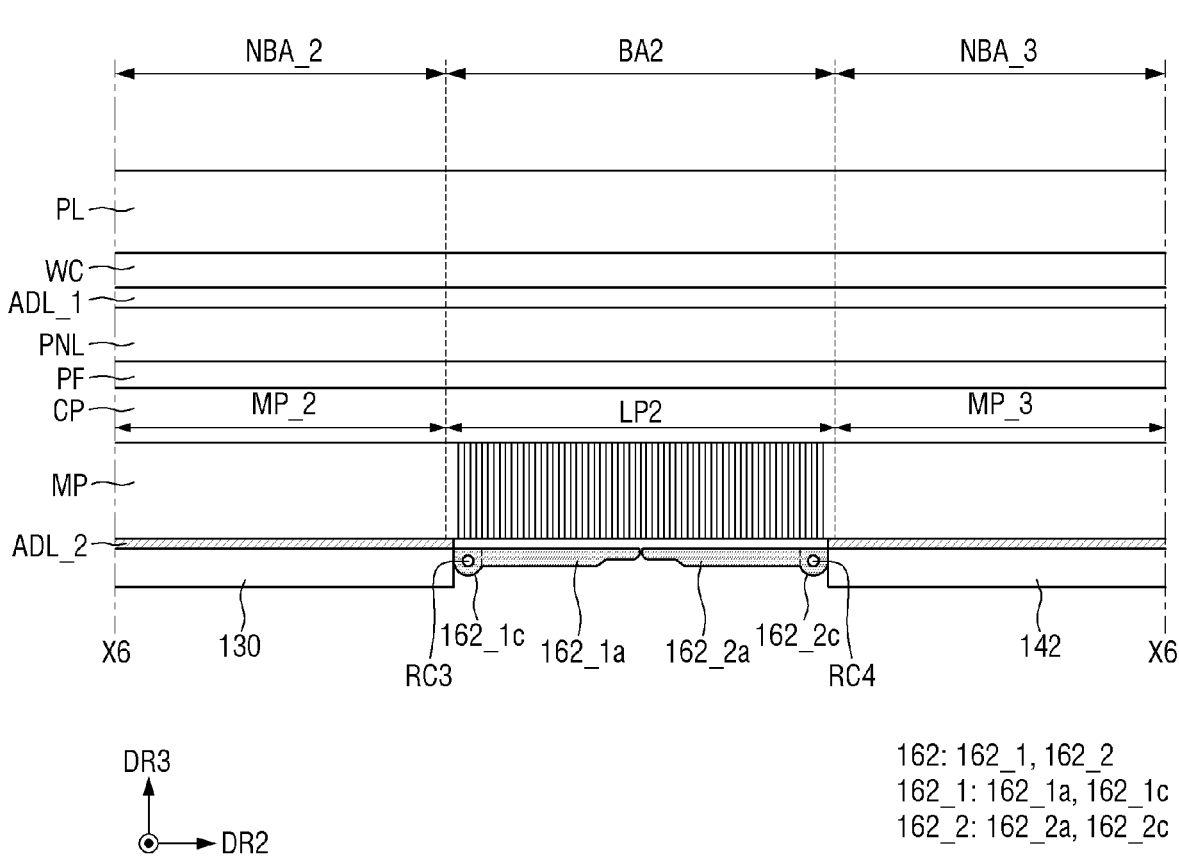
Figure 27:
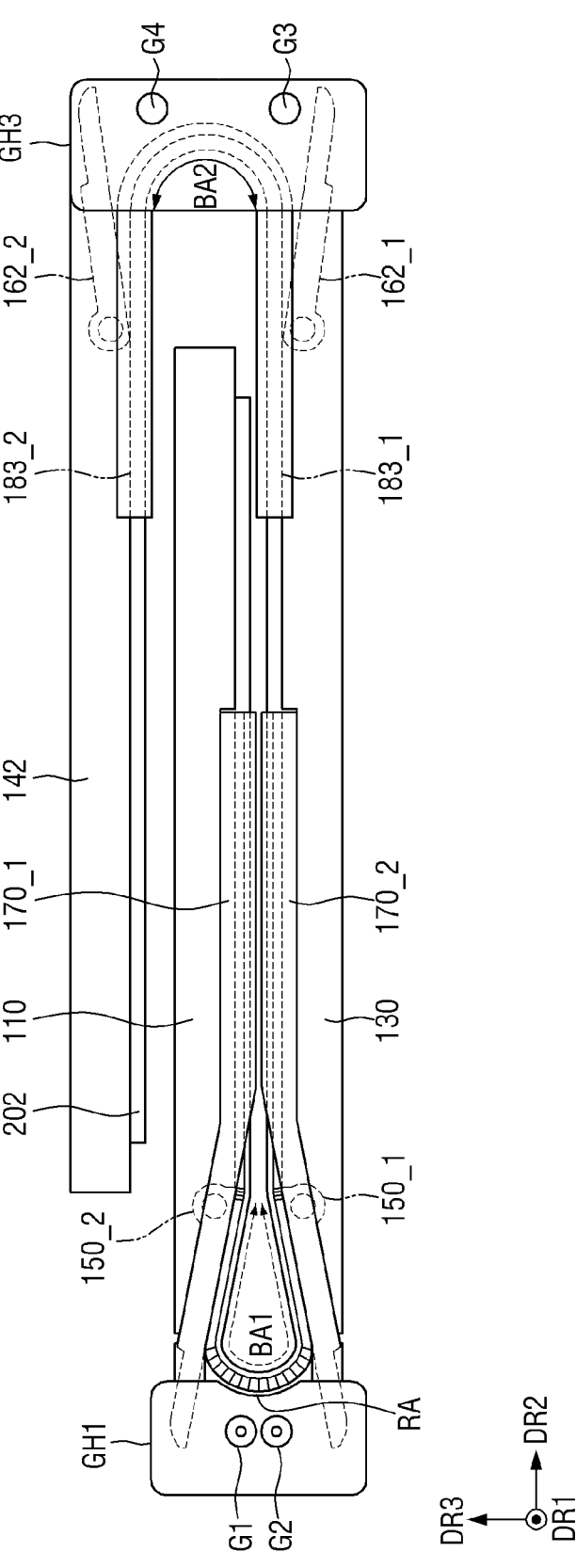
Figure 28:
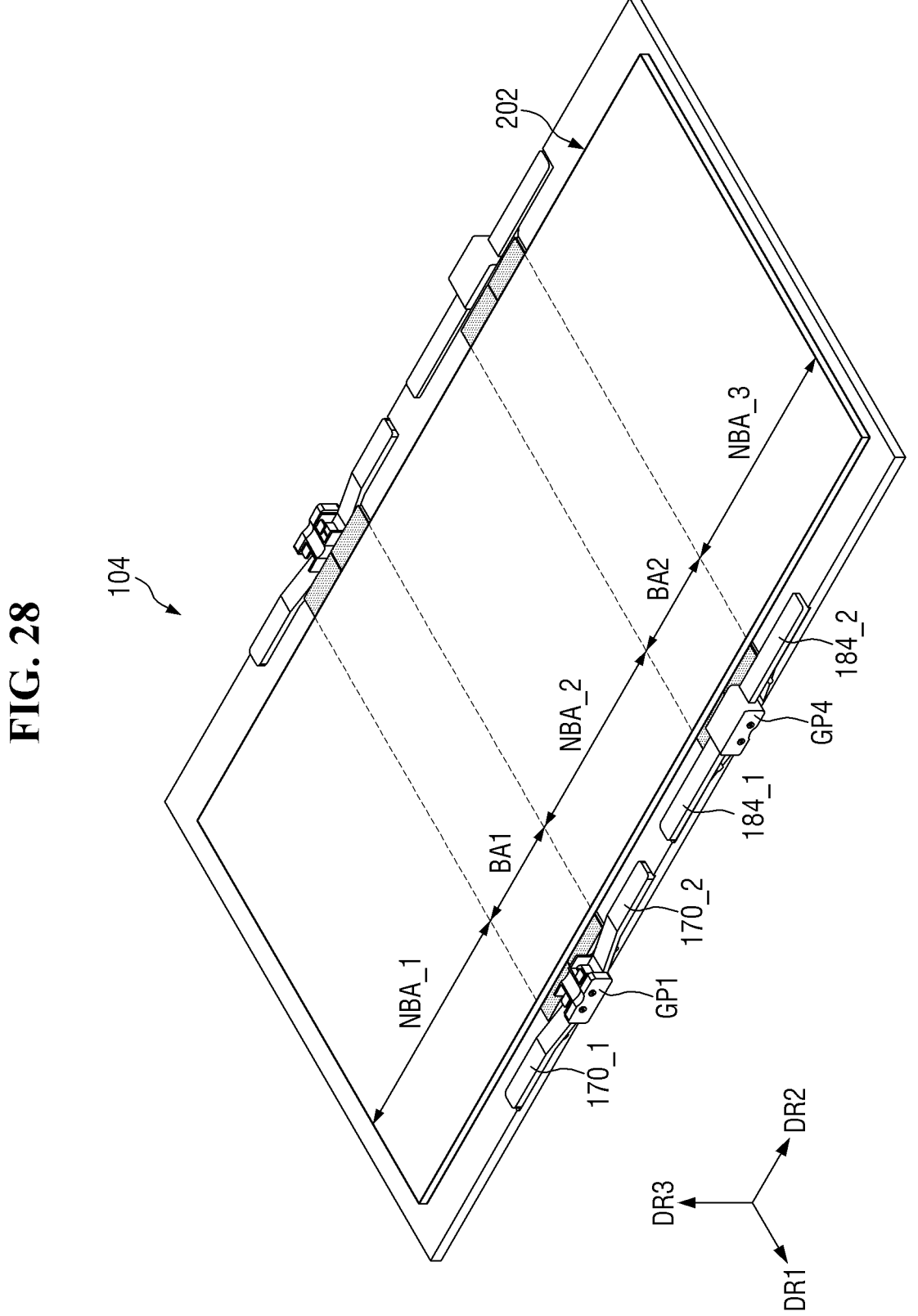
Figure 29:
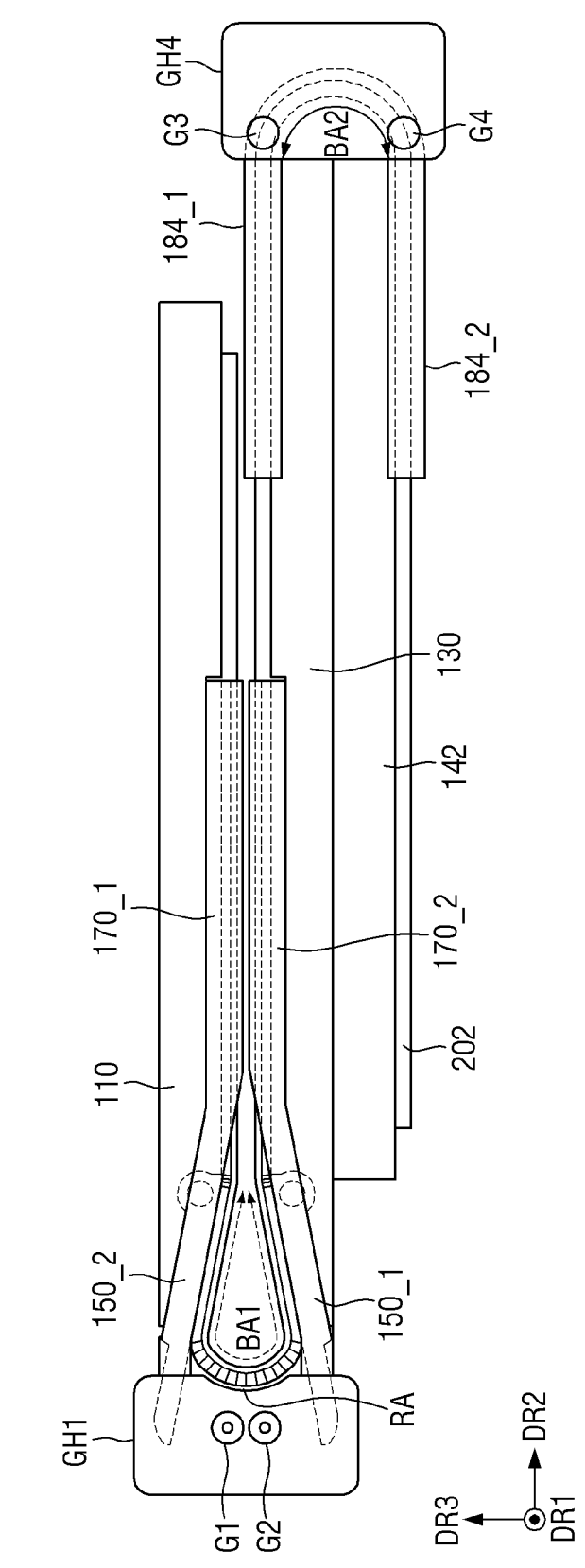
Figure 30:
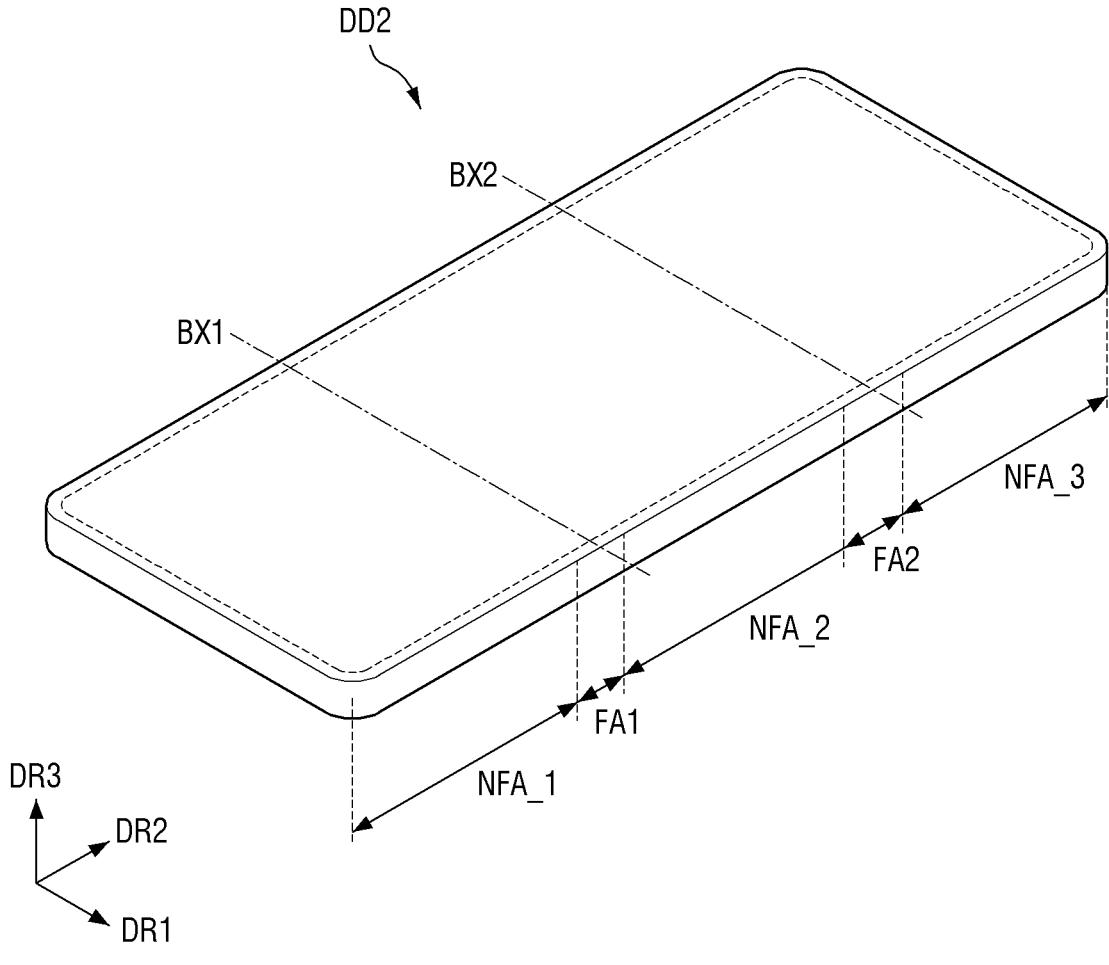
Figure 31:
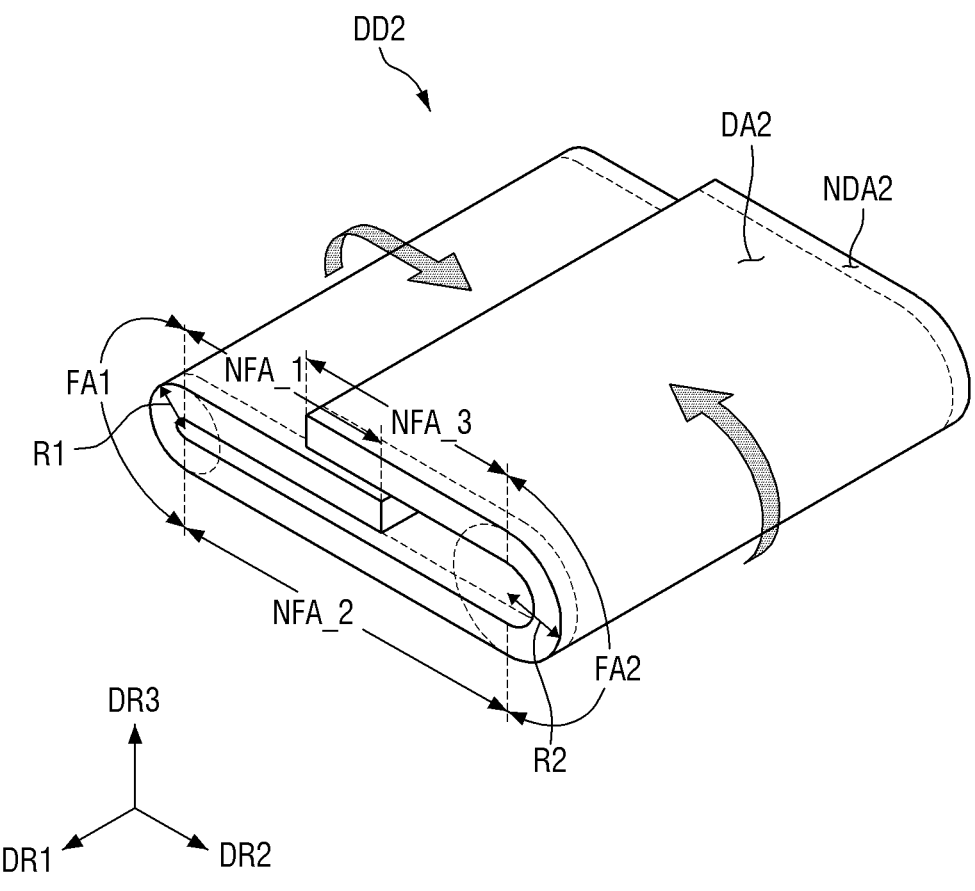
Figure 32:
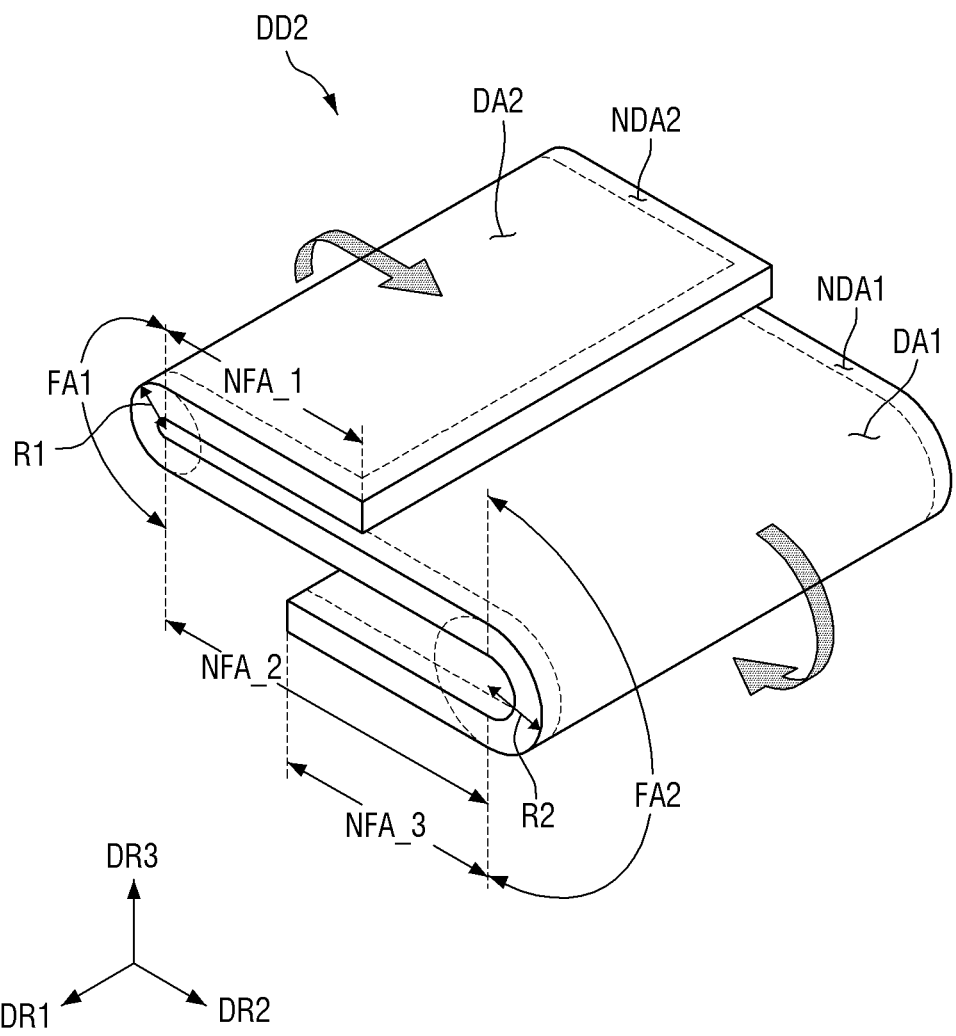

FIG. 1 is a schematic perspective view illustrating a jig for testing a flexible panel according to one embodiment;

FIG. 2 is a schematic side view illustrating that the jig for testing a flexible panel according to an embodiment of FIG. 1 is viewed in a first direction;

FIG. 3 is a schematic cross-sectional view taken along line X1-X1' of FIG. 1;

FIG. 4 is a schematic cross-sectional view taken along line X2-X2' of FIG. 1;

FIG. 5 is a schematic structural view illustrating a coupling relation of a first flat panel frame and a first wing plate member;

FIG. 6 is a schematic perspective view illustrating that a display member is disposed on the jig for testing a flexible panel according to an embodiment of FIG. 1;

FIG. 7 is a schematic structural view illustrating a structure of a display member;

FIG. 8 is a schematic cross-sectional view taken along line X3-X3' of FIG. 6;

FIG. 9 is a schematic perspective view illustrating that the jig for testing a flexible panel and the display member, which are shown in FIG. 6, are folded;

FIG. 10 is a schematic side view illustrating that a folded state of the jig for testing a flexible panel and the display member, which are shown in FIG. 6, is viewed in a first direction;

FIG. 11 is a schematic cross-sectional view taken along line X4-X4' of FIG. 9;

FIG. 12 is an enlarged schematic view illustrating area Q1 of FIG. 9;

FIG. 13 is an enlarged schematic view illustrating area Q2 of FIG. 9;

FIG. 14 is an enlarged schematic view illustrating area Q3 of FIG. 9;

Figure 15:
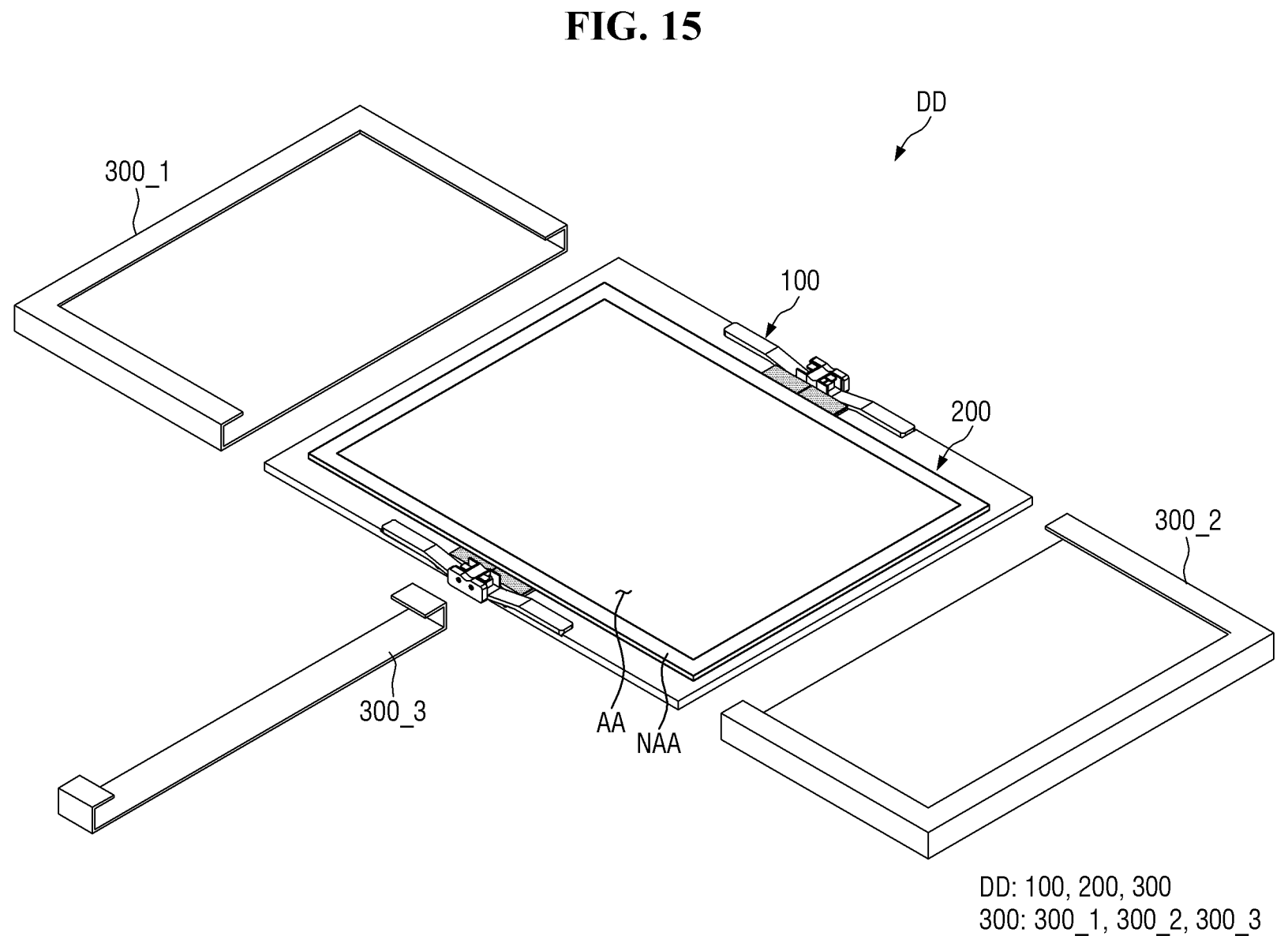

FIG. 15 is an exploded schematic perspective view illustrating a display device according to one embodiment;

FIG. 16 is a schematic perspective view illustrating the display device according to an embodiment of FIG. 15;

FIG. 17 is a schematic perspective view illustrating that the display device according to an embodiment of FIG. 15 is folded;

FIG. 18 is a schematic perspective view illustrating a structure of a jig for testing a flexible panel according to another embodiment;

FIG. 19 is a schematic side view illustrating that the jig for testing a flexible panel according to an embodiment of FIG. 18 is viewed in a first direction;

FIG. 20 is a schematic cross-sectional view taken along line X5-X5' of FIG. 18;

FIG. 21 is a schematic structural view illustrating a first dumbbell and a second dumbbell are disposed in a state that the jig for testing a flexible panel according to an embodiment of FIG. 18 is folded;

Figure 22:
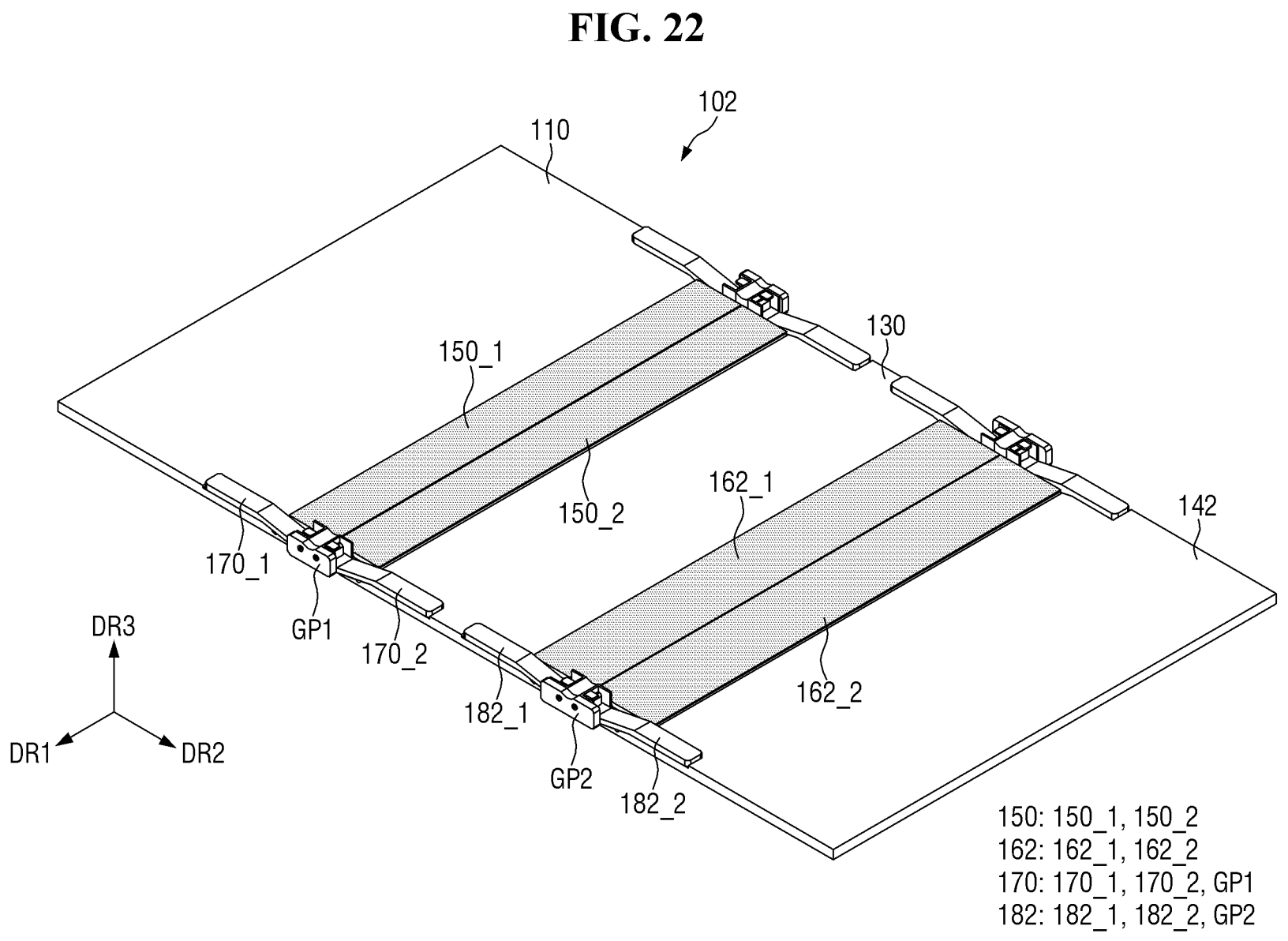

FIG. 22 is a schematic perspective view illustrating a structure of a jig for testing a flexible panel according to still another embodiment;

Figure 23:
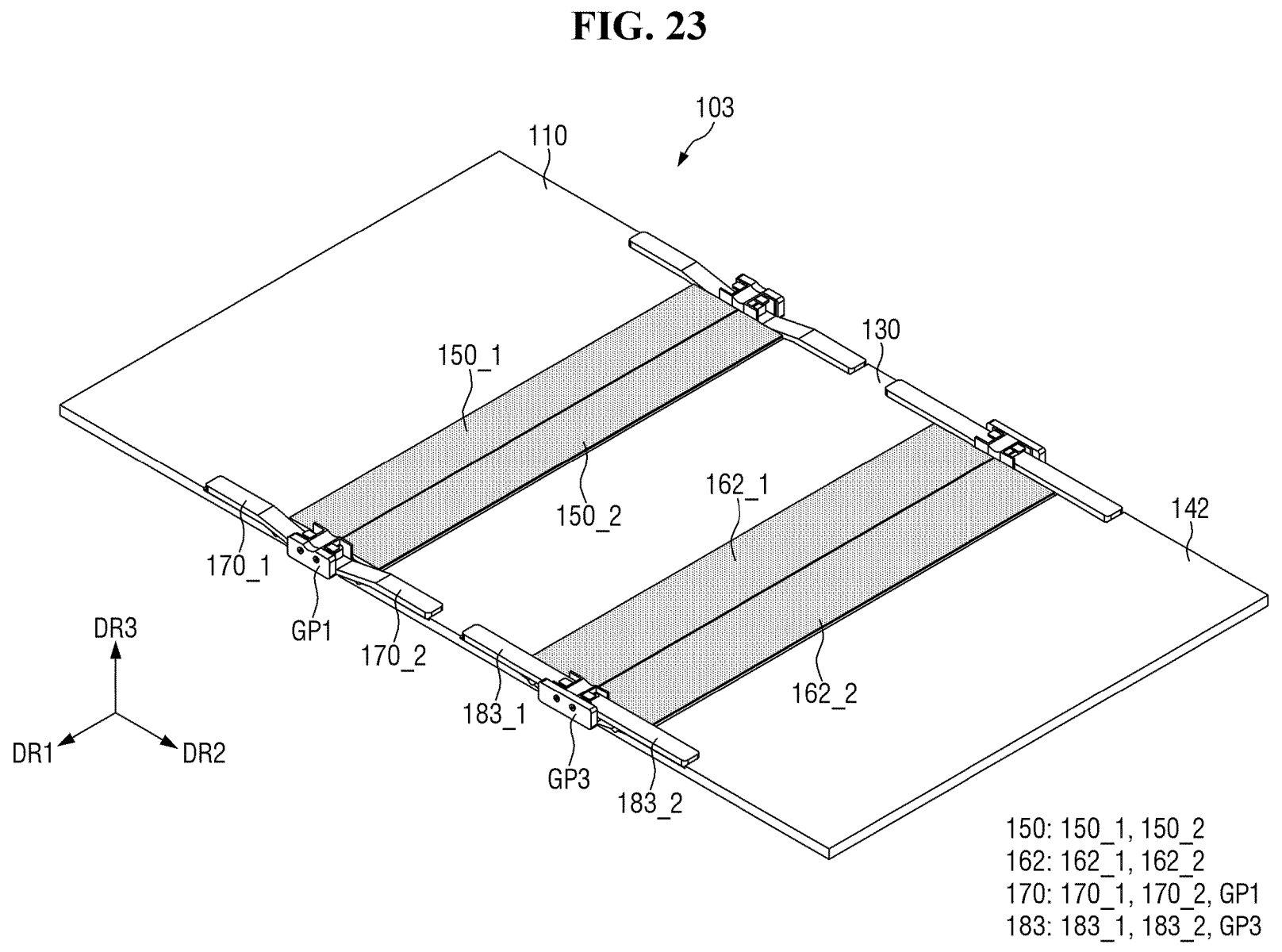

FIG. 23 is a schematic perspective view illustrating a structure of a jig for testing a flexible panel according to further still another embodiment;

FIG. 24 is a schematic side view illustrating that the jig for testing a flexible panel according to an embodiment of FIG. 23 is viewed in a first direction;

Figure 25:
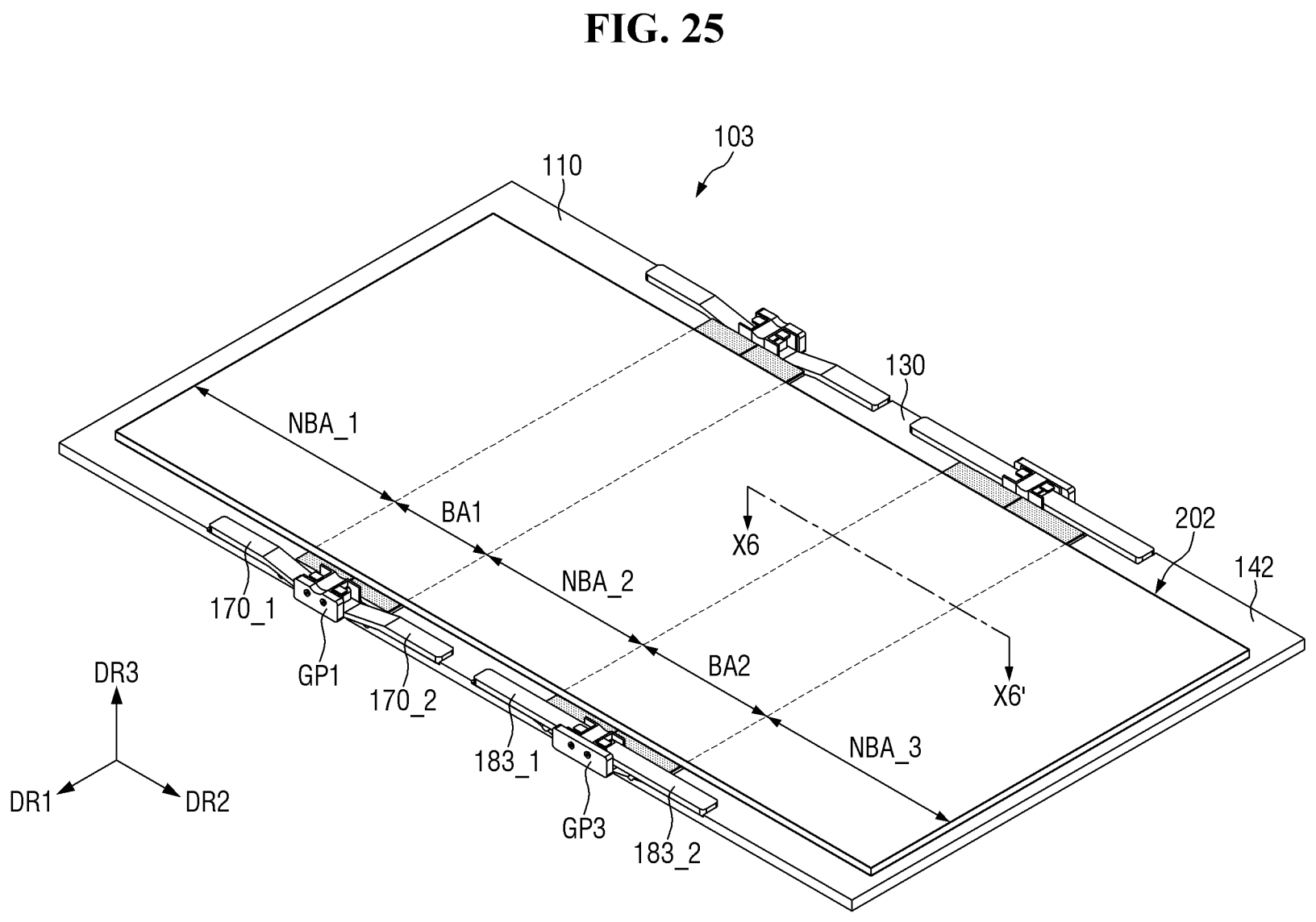

FIG. 25 is a schematic perspective view illustrating that a display member is disposed on the jig for testing a flexible panel according to an embodiment of FIG. 23;

FIG. 26 is a schematic cross-sectional view taken along line X6-X6' of FIG. 25;

FIG. 27 is a schematic side view illustrating that a folded state of the jig for testing a flexible panel and the display member, which are shown in FIG. 23, is viewed in a first direction;

FIG. 28 is a schematic perspective view illustrating that a display member is disposed on the jig for testing a flexible panel according to another embodiment;

FIG. 29 is a schematic side view illustrating that a folded state of the jig for testing a flexible panel and the display member, which are shown in FIG. 28, is viewed in a first direction;

FIG. 30 is a schematic perspective view illustrating a display device according to another embodiment;

FIG. 31 is a schematic perspective view illustrating that the display device according to an embodiment of FIG. 30 is folded; and FIG. 32 is a schematic perspective view illustrating that the display device according to an embodiment of FIG. 30 is folded.

DETAILED DESCRIPTION OF THE EMBODIMENTS

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

As used herein, the singular forms, "a," "an," and "the" are intended to include the plural forms as well, unless the context clearly indicates otherwise.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as "not overlapping" or to "not overlap" another element, this may include that the elements are spaced apart from each other, offset from each other, or set aside from each other or any other suitable term as would be appreciated and understood by those of ordinary skill in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

Features of each of various embodiments of the disclosure may be partially or entirely combined with each other and may technically variously interwork with each other, and respective embodiments may be implemented independently of each other or may be implemented together in association with each other.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic perspective view illustrating a jig for testing a flexible panel according to one embodiment. FIG. 2 is a schematic side view illustrating that the jig for testing a flexible panel according to an embodiment of FIG. 1 is viewed in a first direction. FIG. 3 is a schematic cross-sectional view taken along line X1-X1' of FIG. 1. FIG. 4 is a schematic cross-sectional view taken along line X2-X2' of FIG. 1. FIG. 5 is a schematic structural view illustrating a coupling relation of a first flat panel frame and a first wing plate member.

A jig 100 for testing a flexible panel according to one embodiment may be a device for guiding folding behavior of a panel to test bending characteristics of a flexible panel having flexibility, but embodiments are not limited thereto. For example, the jig 100 for testing a flexible panel according to one embodiment may be a support that supports a display member 200 (see FIG. 7) including a display panel PNL (see FIG. 7), and may be a partial element of a display device DD (see FIG. 15). Hereinafter, for convenience of description, the "jig 100 for testing a flexible panel" may be referred to as a "jig 100."

Referring to FIG. 1, the jig 100 according to one embodiment may have a three-dimensional shape. In the drawing, a direction parallel with a first side (vertical side) of the jig 100 is indicated as a first direction DR1, and a direction parallel with a second side (horizontal side) of the jig 100 is indicated as a second direction DR2, and a thickness direction of the jig 100 is indicated as a third direction DR3. In the description below, unless otherwise mentioned, the "direction" may refer to both directions that are directed toward both sides extended along the direction. When it is desired to distinguish both "directions" extended to both sides, one side is referred to as "one side direction" and the other side is referred to as "the other side direction". A direction toward which an arrow is directed based on FIG. 1 is referred to as one side, and its opposite direction is referred to as the other side. The first direction DR1 and the second direction DR2 may be perpendicular to each other, the second direction DR2 and the third direction DR3 may be perpendicular to each other, and the first direction DR1 and the third direction DR3 may be perpendicular to each other, but the disclosure is not limited thereto.

When referring to surfaces of the jig 100 or each member constituting the jig 100, one surface facing one side in the third direction DR3 based on FIG. 1 is referred to as an upper surface, and its opposite surface is referred to as a bottom surface, but the disclosure is not limited thereto. The one surface and the other surface of the member may be referred to as a front surface and a rear surface, respectively, or may be referred to as a first surface or a second surface.

In some embodiments, a planar shape of the jig 100 may have a rectangular shape with a horizontal side shorter than a vertical side as shown in FIG. 1, but embodiments are not limited thereto. For example, the planar shape of the jig 100 may have a rectangular planar shape in which a vertical side is shorter than a horizontal side.

Referring to FIGS. 2 to 5 in conjunction with FIG. 1, the jig 100 according to one embodiment may include a first flat panel plate 110, a second flat panel plate 130, a first hinge part 170, and a first wing plate member 150. Herein, the first flat panel plate 110 may be referred to as a first flat frame, and the second flat panel plate 130 may be referred to as a second flat frame.

The first flat panel plate 110 may have a flat panel shape, and may overlap a first non-bending area NBA_1 of the display member 200 and serve as a base of a first non-folding area NFA_1 of the display device DD, as described below.

The first flat panel plate 110 may include a flat panel area 110a having a flat upper surface and inclined areas 110b and 110c protruded from both ends of the flat panel area 110a in the first direction DR1 to one side in the second direction DR2 to form an inclination in a direction toward the bottom surface of the first flat panel plate 110 based on the flat panel area 110a, for example, toward the outside of the jig 100. The inclined area of one end in the first direction DR1 may be referred to as the first inclined area 110b, and the inclined area of the other end in the first direction DR1 may be referred to as the second inclined area 110c.

In some embodiments, the planar shape of the first flat panel plate 110 may generally have a rectangular shape in which a side in the first direction DR1 is longer than a side in the second direction DR2, but embodiments are not limited thereto. For example, the planar shape of the first flat panel plate 110 may have a rectangular shape in which the side in the first direction DR1 is shorter than the side in the second direction DR2.

The second flat panel plate 130 may have a flat panel shape, and may overlap a second non-bending area NBA_2 of the display member 200 and serve as a base of a second non-folding area NFA_2 of the display device DD, as described below.

The second flat panel plate 130 may be disposed to be spaced apart from the first flat panel plate 110 in the second direction DR2. In other words, both ends of the first flat panel plate 110 in the first direction DR1 and both ends of the second flat panel plate 130 in the second direction DR2 may be connected to each other by a first hinge part 170, which will be described below, but may be spaced apart from each other in the second direction DR2 in the other portions to form a gap space in which a first wing plate member 150 is disposed as described below.

The second flat panel plate 130 may include a flat panel area 130a having a flat upper surface and inclined areas 130b and 130c protruded from both ends of the flat panel area 130a in the first direction DR1 to the other side in the second direction DR2 to form an inclination in a direction toward the bottom surface of the second flat panel plate 130 based on the flat panel area 130a, for example, toward the outside of the jig 100. The inclined area of one end in the first direction DR1 may be referred to as the second inclined area 130b, and the inclined area of the other end in the first direction DR1 may be referred to as the second inclined area 130c.

In some embodiments, the planar shape of the second flat panel plate 130 may generally have a rectangular shape in which a side in the first direction DR1 is longer than a side in the second direction DR2, but embodiments are not limited thereto. For example, the planar shape of the first flat panel plate 110 may have a rectangular shape in which the side in the first direction DR1 is shorter than the side in the second direction DR2.

The second flat panel plate 130 corresponds to the first flat panel plate 110, but may have substantially the same area as that of the first flat panel plate 110, but embodiments are not limited thereto.

The first hinge part 170 may connect the first flat panel plate 110 with the second flat panel plate 130, and may serve to allow the first flat panel plate 110 and the second flat panel plate 130 to be subjected to folding behavior. The folding behavior of the first flat panel plate 110 and the second flat panel plate 130 may mean that the jig 100 is folded.

In some embodiments, the jig 100 may be folded in an in-folding manner in which the upper surface of the first flat panel plate 110 and the upper surface of the second flat panel plate 130 face each other in a folded state as shown in FIG. 9, but embodiments are not limited thereto. For example, the jig 100 may be folded in an out-folding manner in which the bottom surface of the first flat panel plate 110 and the bottom surface of the second flat panel plate 130 face each other in a folded state.

The first hinge part 170 may be disposed at both ends in the first direction DR1 of the jig 100 between the first flat panel plate 110 and the second flat panel plate 130 to connect both ends of the first flat panel plate 110 in the first direction DR1 with both ends of the second flat panel plate 130 in the first direction DR1. Therefore, the first hinge part 170 may be spaced apart from another hinge part in the first direction DR1 to define a gap space.

The first hinge part 170 may include a first gear arm 170_1, a second gear arm 170_2, and a first gear portion GP1.

The first gear arm 170_1 of the first hinge part 170 may be attached to the first flat panel plate 110 to guide the folding behavior of the first flat panel plate 110. In detail, the first gear arm 170_1 may be disposed on the flat panel area 110a and the inclined areas 110b and 110c at both ends in the first direction DR1 of one side of the first flat panel plate 110 in the second direction DR2, and may be connected to the first gear portion GP1. In some embodiments, the first flat panel plate 110 and the first gear arm 170_1 may be attached to each other through bolts and nuts, but are not limited thereto. For example, the first flat panel plate 110 and the first gear arm 170_1 may be attached to each other through a separate adhesive member such as a pressure sensitive adhesive (PSA).

The first gear arm 170_1 may include a first flat portion 170_1a disposed on the flat panel area 110a of the first flat panel plate 110 and attached to the first flat panel plate 110, and a first inclined portion 170_1b disposed on the inclined areas 110b and 110c of the first flat panel plate 110 and attached to the first flat panel plate 110. The first flat portion 170_1a may have a surface parallel with an upper surface of the flat panel area 110a of the first flat panel plate 110. On the other hand, the first inclined portion 170_1b may have a surface parallel with the upper surface of the inclined areas 110b and 110c of the first flat panel plate 110. Therefore, the first inclined portion 170_1b may be inclined toward the bottom surface of the first flat panel plate 110 based on the first flat portion 170_1a. In other words, the first inclined portion 170_1b may be inclined toward the outside of the jig 100 based on the first flat portion 170_1a. A portion of one side of the first inclined portion 170_1b in the second direction DR2 may be accommodated in a first gear housing GH1 of the first gear portion GP1 that will be described later.

The first gear arm 170_1 may further include a first sawtooth portion 170_1c that may be accommodated in the first gear housing GH1 of the first gear portion GP1, which will be described later, and may have sawtooth teeth formed therein. In some embodiments, the first sawtooth portion 170_1c may be protruded from one end of the first inclined portion 170_1b in the second direction DR2 to one side in the third direction DR3, but embodiments are not limited thereto. In some embodiments, the sawtooth teeth of the first sawtooth portion 170_1c may be formed on a surface that is not in contact with the first inclined portion 170_1b, but embodiments are not limited thereto.

The second gear arm 170_2 of the first hinge part 170 may be attached to the second flat panel plate 130 to guide the folding behavior of the second flat panel plate 130. In detail, the second gear arm 170_2 may be disposed on the flat panel area 130a and the inclined areas 130b and 130c at both ends in the first direction DR1 of the other side of the second flat panel plate 130 in the second direction DR2, and may be connected to the first gear portion GP1. In some embodiments, the second flat panel plate 130 and the second gear arm 170_2 may be attached to each other through bolts and nuts, but are not limited thereto. For example, the second flat panel plate 130 and the second gear arm 170_2 may be attached to each other through a separate adhesive member such as a pressure sensitive adhesive (PSA).

The second gear arm 170_2 may include a second flat portion 170_2a disposed on the flat panel area 130a of the second flat panel plate 130 and attached to the second flat panel plate 130, and a second inclined portion 170_2b disposed on the inclined areas 130b and 130c of the second flat panel plate 130 and attached to the second flat panel plate 130. The second flat portion 170_2a may have a surface parallel with an upper surface of the flat panel area 130a of the second flat panel plate 130. On the other hand, the second inclined portion 170_2b may have a surface parallel with the upper surface of the inclined areas 130b and 130c of the second flat panel plate 130. Therefore, the second inclined portion 170_2b may be inclined toward the bottom surface of the second flat panel plate 130 based on the second flat portion 170_2a. In other words, the second inclined portion 170_2b may be inclined toward the outside of the jig 100 based on the second flat portion 170_2a.

The second gear arm 170_2 may further include a second sawtooth portion 170_2c that may be accommodated in the first gear housing GH1 of the first gear portion GP1, which will be described later, and may have sawtooth teeth formed therein. In some embodiments, the second sawtooth portion 170_2c may be protruded from the other end of the second inclined portion 170_2b in the second direction DR2 to one side in the third direction DR3, but embodiments are not limited thereto. In some embodiments, the sawtooth teeth of the second sawtooth portion 170_2c may be formed on a surface that is not in contact with the second inclined portion 170_2b, but embodiments are not limited thereto.

The first gear portion GP1 of the first hinge part 170 may engage the first gear arm 170_1 with the second gear arm 170_2 to control the operation of the first gear arm 170_1 and the second gear arm 170_2. The first gear portion GP1 may include a first gear housing GH1, a first gear pin G1, a second gear pin G2, and auxiliary sawtooth teeth SG.

The first gear housing GH1 may form an external appearance of the first gear portion GP1, and may serve to protect various members disposed inside the first gear housing GH1 from the outside. As a panel exposing area RA concavely bent in a direction toward the inside of the first gear housing GH1 is defined in the first gear housing GH1, the display member 200, for example, a side of the flexible panel may be exposed to be visible to a tester through the panel exposing area RA, so that the tester may readily test bending characteristics of the flexible panel. A detailed description of the first gear housing GH1 will be described later.

The first gear housing GH1 may have a space capable of accommodating various members as an empty space inside. The first sawtooth portion 170_1c of the first gear arm 170_1 and the second sawtooth portion 170_2c of the second gear arm 170_2 may be engaged with each other inside the first gear housing GH1. In detail, auxiliary sawtooth teeth SG disposed at one side inside the first gear housing GH1 in the third direction DR3, the sawtooth teeth of the first sawtooth portion 170_1c and the sawtooth teeth of the second sawtooth portion 170_2c are engaged with one another, so that the first gear arm 170_1 and the second gear arm 170_2 may be stably behaved.

The first gear pin G1 may serve to assist rotation behavior of the first gear arm 170_1. The first gear pin G1 may be a cylindrical member passing through the inside of the first sawtooth portion 170_1c of the first gear arm 170_1. The first gear arm 170_1 may be rotated around the first gear pin G1 during the folding behavior. Therefore, the first flat panel plate 110 attached to the first gear arm 170_1 may be folded by rotating around the first gear pin G1.

The second gear pin G2 may serve to assist the rotation behavior of the second gear arm 170_2. The second gear pin G2 may be a cylindrical member passing through the inside of the second sawtooth portion 170_2c of the second gear arm 170_2. The second gear arm 170_2 may be rotated around the second gear pin G2 during the folding behavior. Therefore, the second flat panel plate 130 attached to the second gear arm 170_2 may be folded by rotating around the second gear pin G2.

The first wing plate member 150 may serve to support the first bending area BA1 of the display member 200, which will be described later, in a state that the jig 100 is unfolded, and may freely move the first bending area BA1 of the display member 200 in a state that the jig 100 is folded. The first wing plate member 150 may be disposed in a gap space between the first flat panel plate 110 and the second flat panel plate 130. In detail, the first wing plate member 150 may be disposed in gap space in the first direction DR1 between the first hinge parts 170 disposed at both ends of the first flat panel plate 110 and the second flat panel plate 130 in the first direction DR1, for example, a gap space between the inclined areas 110b and 110c of the first flat panel plate 110 in the first direction DR1 and a gap space between the inclined areas 130b and 130c of the second flat panel plate 130 in the first direction DR1.

An upper surface of the first wing plate member 150 may form a non-bent surface with an upper surface of the first flat panel plate 110 and an upper surface of the second flat panel plate 130 in a state that the jig 100 is unfolded. In other words, the upper surface of the first wing plate member 150, the upper surface of the first flat panel plate 110, and the upper surface of the second flat panel plate 130 may be disposed on one plane.

The first wing plate member 150 may include a (1_1)th wing plate 150_1 connected to the first flat panel plate 110, and a (1_2)th wing plate 150_2 connected to the second flat panel plate 130.

The (1_1)th wing plate 150_1 may have a rectangular planar shape having a long side in the first direction DR1 and a short side in the second direction DR2. In some embodiments, a width of the (1_1)th wing plate 150_1 in the first direction DR1 may be substantially the same as a gap distance in the first direction DR1 between the first inclined area 110b and the second inclined area 110c of the first flat panel plate 110, but embodiments are not limited thereto.

As shown in FIG. 4, the (1_1)th wing plate 150_1 may include a first rotation area 150_1c, a (1_1)th area 150_1a, and a (1_2)th area 150_1b.

In case that the jig 100 is folded, the first rotation area 150_1c of the (1_1)th wing plate 150_1 may serve to rotate the (1_1)th wing plate 150_1 toward the outside of the jig 100. The first rotation area 150_1c may be an area through which a first rotation shaft RC1 extended in the first direction DR1 passes. The first rotation shaft RC1 may have a cylindrical shape. As shown in FIG. 5, the first rotation shaft RC1 may pass through the first rotation area 150_1c in the first direction DR1 to reach the first inclined area 110b and the second inclined area 110c of the first flat panel plate 110. In other words, the (1_1)th wing plate 150_1 may be connected to the first flat panel plate 110 through the first rotation shaft RC1.

The (1_1)th area 150_1a of the (1_1)th wing plate 150_1 may be an area disposed on one side of the first rotation area 150_1c in the second direction DR2 based on FIG. 4. The (1_1)th area 150_1a may be an area in which a first sub-flat panel portion SMP_1 of a panel support MP of the display member 200, which will be described later, is disposed. The (1_2)th area 150_1b of the (1_1)th wing plate 150_1 may be an area disposed on one side of the (1_1)th area 150_1 in the second direction DR2 based on FIG. 4. The (1_2)th area 150_1b may be an area in which a first main lattice pattern portion LP1 of the panel support MP of the display member 200 is disposed. The (1_1)th area 150_1a and the (1_2)th area 150_1b will be described later in detail.

The (1_1)th wing plate 150_1 may have a rectangular planar shape having a long side in the first direction DR1 and a short side in the second direction DR2. In some embodiments, a width of the (1_1)th wing plate 150_1 in the first direction DR1 may be substantially the same as the gap distance in the first direction DR1 between the first inclined area 110b and the second inclined area 110c of the first flat panel plate 110, but embodiments are not limited thereto.

As shown in FIG. 4, the (1_2)th wing plate 150_2 may include a second rotation area 150_2c, a (2_1)th area 150_2a, and a (2_2)th area 150_2b.

In case that the jig 100 is folded, the second rotation area 150_2c of the (1_2)th wing plate 150_2 may serve to rotate the (1_2)th wing plate 150_2 toward the outside of the jig 100. The second rotation area 150_2c may be an area through which a second rotation shaft RC2 extended in the first direction DR1 passes. The second rotation shaft RC2 may have a cylindrical shape. Although not shown, the second rotation shaft RC2 may pass through the second rotation area 150_2c in the first direction DR1 to reach the first inclined area 130b and the second inclined area 130c of the second flat panel plate 130 similarly to the first rotation shaft RC1. In other words, the (1_2)th wing plate 150_2 may be connected to the second flat panel plate 130 through the second rotation shaft RC2.

The (2_1)th area 150_2a of the (1_2)th wing plate 150_2 may be an area disposed on the other side of the second rotation area 150_2c in the second direction DR2 based on FIG. 4. The (2_1)th area 150_2a may be an area in which a second sub-flat panel portion SMP_2 of the panel support MP of the display member 200, which will be described later, is disposed. The (2_2)th area 150_2b of the (1_2)th wing plate 150_2 may be an area disposed on one side of the (2_1)th area 150_2a in the second direction DR2 based on FIG. 4. The (2_2)th area 150_2b may be an area in which the first main lattice pattern portion LP1 of the panel support MP of the display member 200 is disposed. A detailed description of the (2_1)th area 150_2a and the (2_2)th area 150_2b will be described later.

In some embodiments, in case that the jig 100 is unfolded, one end of the (1_2)th area 150_1b of the (1_1)th wing plate 150_1 in the second direction DR2 and the other end of the (2_2)th area 150_2b of the (1_2)th wing plate 150_2 in the second direction DR2 may be in contact with each other, but are not limited thereto. In a state that the jig 100 is unfolded, in case that one end of the (1_2)th area 150_1b of the (1_1)th wing plate 150_1 in the second direction DR2 and the other end of the (2_2)th area 150_2b of the (1_2)th wing plate 150_2 in the second direction DR2 are in contact with each other, the first main lattice pattern portion LP1 of the panel support MP of the display member 200, which will be described later, may be stably supported Hereinafter, a method of testing bending characteristics of the display member 200 in accordance with folding behavior of the jig 100 as the display member 200 is disposed on an upper surface of the jig 100 will be described in detail.

FIG. 6 is a schematic perspective view illustrating that a display member is disposed on the jig for testing a flexible panel according to an embodiment of FIG. 1. FIG. 7 is a schematic structural view illustrating a structure of a display member. FIG. 8 is a schematic cross-sectional view taken along line X3-X3' of FIG. 6.

Referring to FIG. 6, the display member 200 may be disposed on the upper surface of the jig 100. The display member 200 may include an active area AA defining a display area DA of the display device DD, which will be described later, and a non-active area NAA surrounding the active area AA. The display member 200 may overlap the flat panel area 110a of the first flat panel plate 110, the flat panel area 130a of the second flat panel plate 130, and the first wing plate member 150 on the upper surface of the jig 100, and may not overlap the first hinge part 170, the inclined areas 110b and 110c of the first flat panel plate 110, and the inclined areas 130b and 130c of the second flat panel plate 130.

The display member 200 may include a first non-bending area NBA_1 and a second non-bending area NBA_2, which may be flat panel areas, and a first bending area BA1 that may be bent. The first bending area BA1 may be disposed between the first non-bending area NBA_1 and the second non-bending area NBA_2. The first non-bending area NBA_1 of the display member 200 may overlap the flat panel area 110a of the first flat panel plate 110 in the third direction DR3, and the second non-bending area NBA_2 may overlap the flat panel area 130a of the second flat panel plate 130 in the third direction DR3, and the first bending area BA1 may overlap the first wing plate member 150 in the third direction DR3.

Referring to FIGS. 7 and 8, the display member 200 may include an upper protective film PL, a window member WC, a first adhesive member ADL_1, a display panel PNL, a support film PF, a panel lower member CP, and a panel support MP, and a second adhesive member ADL_2 may be interposed between the display member 200 and the jig 100 so that the display member 200 and the jig 100 may be attached to each other.

The upper protective film PL of the display member 200 may serve to perform at least one function of anti-scattering, shock absorption, anti-scratch, anti-fingerprinting or anti-glare of the window 1100, which will be described later. The upper protective film PL may be disposed on an upper surface of the window member WC. The upper protective film PL may be attached to the upper surface of the window member WC through an adhesive member such as a pressure-sensitive adhesive, for example.

The window member WC of the display member 200 may serve to protect the display panel PNL, which will be described later, from the outside. The window member WC may be disposed on the bottom surface of the upper protection film PL or the upper surface of the display panel PNL. The window member WC is made of a transparent material, for example, glass or plastic. In detail, the window member WC may be a thin film glass or a transparent polyimide film, which has a width of 0.3 mm or less in the third direction DR3.

The window member WC may be attached to the upper surface of the display panel PNL by the first adhesive member ADL_1. The first adhesive member ADL_1 may be a transparent adhesive film or a transparent adhesive resin.

The display panel PNL may be a panel that displays a screen, and all types of display panels such as an organic light emitting display panel including an organic light emitting layer, a micro light emitting diode display panel using a micro light emitting diode, a quantum dot light emitting display panel using a quantum dot light emitting diode including a quantum dot light emitting layer or an inorganic light emitting display panel using an inorganic light emitting diode including an inorganic semiconductor may be applied to the display panel PNL of an embodiment. Based on FIG. 6, the display panel PNL may display a screen on one side in the third direction DR3.

The display panel PNL may include a substrate having flexibility. In some embodiments, the substrate may include polyimide, but embodiments are not limited thereto. The first non-bending area NBA_1, the first bending area BA1, and the second non-bending area NBA_2 of the display member 200 may be applied to the display panel PNL.

The support film PF of the display member 200 may serve to support the display panel PNL and protect the bottom surface of the display panel PNL. The support film PF may be disposed on the bottom surface of the display panel PNL. In some embodiments, the support film PF may be a plastic such as polyethylene terephthalate or polyimide, but embodiments are not limited thereto. Although FIGS. 7 and 8 illustrate that the support film PF is disposed on the first bending area BA1 of the display device DD, the disclosure is not limited thereto. For example, in order to smoothly fold the display device DD, the panel protective member may be removed from the first bending area BA1 of the display device DD, and may be disposed only on the first non-bending area NBA_1 and the second non-bending area NBA_2.

The panel lower member CP of the display member 200 may be disposed on the bottom surface of the support film PF. The panel lower member CP may include at least one of a light shielding layer for absorbing light incident from the outside, a buffer layer for absorbing impact from the outside, and a heat dissipation layer for efficiently emitting heat of the display panel PNL.

The light shielding layer may prevent the elements disposed below the light shielding layer, for example, a digitizer, which will be described later, from being visible on a front surface of the display panel PNL, by preventing light from being transmitted. The light shielding layer may include a light absorbing material such as a black pigment or a black dye.

The buffer layer may absorb external shock to prevent the display panel PNL from being damaged. The buffer layer may be comprised of a single layer or multiple layers. For example, the buffer layer may be formed of a polymer resin such as polyurethane, polycarbonate, polypropylene, and/or polyethylene, or may include a material having elasticity such as rubber, urethane-based material and/or sponge foam-molded from an acrylic-based material.

The heat dissipation layer may include a first heat dissipation layer including graphite or carbon nanotubes, and a second heat dissipation layer formed of a metal thin film such as copper, nickel, ferrite and/or silver, which may shield electromagnetic waves and have excellent thermal conductivity.

The panel support MP of the display member 200 may serve to support a rear surface of the display panel PNL. The panel support MP may be disposed on the bottom surface of the panel lower member CP or the upper surface of the jig 100. The panel support MP may be a rigid member that may not be changed in shape or volume by pressure from the outside. In some embodiments, the panel support MP may include, but embodiments are not limited to, a metal having rigidity, e.g., SUS304, or the like. For example, the panel support MP may be a carbon fiber reinforced plastic (CFRP) that includes fiber yarns extended in the first direction DR1 or the second direction DR2 and a resin covering the fiber yarns. Hereinafter, the description will be based on that the panel support MP includes a metal. In case that the panel support MP includes a metal, it may be referred to as a metal support.

The panel support MP may include a first flat panel portion MP_1 that overlaps the first non-bending area NBA_1 of the display member 200, a second flat panel portion MP_2 that overlaps the second non-bending area NBA_2 of the display member 200, and a first sub-lattice pattern portion SLP_1, a first sub-flat panel portion SMP_1, a first main lattice pattern portion LP1, a second sub-flat panel portion SMP_2 and a second sub-lattice pattern portion SLP_2, which overlap the first bending area BA1 of the display member 200. In detail, the first sub-lattice pattern portion SLP_1 may be disposed between the first flat panel portion MP_1 and the first main lattice pattern portion LP1, and the first sub-flat panel portion SMP_1 may be disposed between the first sub-lattice pattern portion SLP_1 and the first main lattice pattern portion LP1, the second sub-lattice pattern portion SLP_2 may be disposed between the first main lattice pattern portion LP1 and the second flat panel portion MP_2, and the second sub-non-bending area may be disposed between the second sub-lattice pattern portion SLP_2 and the first main lattice pattern portion LP1. In other words, based on FIGS. 7 and 8, the panel support MP may be disposed in the order of the first flat panel portion MP_1, the first sub-lattice pattern portion SLP_1, the first sub-flat panel portion SMP_1, the first main lattice pattern portion LP1, the second sub-flat panel portion SMP_2, the second sub-lattice pattern portion SLP_2, and the second flat panel portion MP_2 along one side of the second direction DR2.

The first flat panel portion MP_1 of the panel support MP may serve to support the first non-bending area NBA_1 of the display member 200. The first flat panel portion MP_1 may overlap the first flat panel plate 110 of the jig 100 in the third direction DR3. The second adhesive member ADL_2 may be interposed between the first flat panel portion MP_1 and the first flat panel plate 110 so that the first flat panel portion MP_1 and the first flat panel plate 110 may be attached to each other.

In case that the jig 100 is folded as described below, the first sub-lattice pattern portion SLP_1 of the panel support MP may serve to guide the display member 200 to be bent toward the outside of the jig 100 along the (1_1)th wing plate 150_1. The first sub-lattice pattern portion SLP_1 may overlap the first rotation area 150_1c of the (1_1)th wing plate 150_1 in the third direction DR3. The first sub-lattice pattern portion SLP_1 may include slits that pass through the panel support MP in the third direction DR3. Therefore, the first sub-lattice pattern portion SLP_1 may be readily bent.

In some embodiments, the second adhesive member ADL_2 may be interposed between the first sub-lattice pattern portion SLP_1 and the first rotation area 150_1c so that the first sub-lattice pattern portion SLP_1 and the first rotation area 150_1c may be attached to each other, but embodiments are not limited thereto. For example, the second adhesive member ADL_2 may not be interposed between the first sub-lattice pattern portion SLP_1 and the first rotation area 150_1c to make sure of bending characteristics. Hereinafter, the description will be based on that the second adhesive member ADL_2 is interposed between the first sub-lattice pattern portion SLP_1 and the first rotation area 150_1c so that the first sub-lattice pattern portion SLP_1 and the first rotation area 150_1c are attached to each other. In a state that the jig 100 is folded, the display member 200 may be stably bent toward the outside of the jig 100 along the (1_1)th wing plate 150_1.

In case that the jig 100 is folded, the first sub-flat panel portion SMP_1 of the panel support MP may serve to guide the display member 200 to be widened toward the outside of the jig 100 along the (1_1)th wing plate 150_1. The first sub-flat panel portion SMP_1 may overlap the (1_1)th area 150_1a of the (1_1)th wing plate 150_1 in the third direction DR3. The second adhesive member ADL_2 may be interposed between the first sub-flat panel portion SMP_1 and the (1_1)th area 150_1a, so that the first sub-flat panel portion SMP_1 and the (1_1)th area 150_1a may be attached to each other.

The first main lattice pattern portion LP1 of the panel support MP may serve to readily bend the display member 200 in the first bending area BA1. The first main lattice pattern portion LP1 may overlap the (1_2)th area 150_1b of the (1_1)th wing plate 150_1 and the (2_2)th area 150_2b of the (1_2)th wing plate 150_2 in the third direction DR3. The first main lattice pattern portion LP1 may include slits passing through the panel support MP in the third direction DR3. Therefore, the first main lattice pattern portion LP1 may be readily bent.

The second adhesive member ADL_2 may not be interposed between the first main lattice pattern portion LP1 and the (1_2)th area 150_1b of the (1_1)th wing plate 150_1. Therefore, a gap space may be formed between the first main lattice pattern portion LP1 and the (1_2)th area 150_1b. A thickness of the gap space may be substantially the same as that of the second adhesive member ADL_2. The second adhesive member ADL_2 may not be interposed between the first main lattice pattern portion LP1 and the (2_2)th area 150_2b of the (1_2)th wing plate 150_2. Therefore, a gap space may be formed between the first main lattice pattern portion LP1 and the (2_2)th area 150_2b. A thickness of the gap space may be substantially the same as that of the second adhesive member ADL_2.

In case that the jig 100 is folded, the second sub-flat panel portion SMP_2 of the panel support MP may serve to guide the display member 200 to be widened toward the outside of the jig 100 along the (1_2)th wing plate 150_2. The second sub-flat panel portion SMP_2 may overlap the (2_1)th area 150_2a of the (1_2)th wing plate 150_2 in the third direction DR3. The second adhesive member ADL_2 may be interposed between the second sub-flat panel portion SMP_2 and the (2_1)th area 150_2a, so that the second sub-flat panel portion SMP_2 and the (2_1)th area 150_2a may be attached to each other.

In case that the jig 100 is folded as described below, the second sub-lattice pattern portion SLP_2 of the panel support MP may serve to guide the display member 200 to be bent toward the outside of the jig 100 along the (1_2)th wing plate 150_2. The second sub-lattice pattern portion SLP_2 may overlap the second rotation area 150_2c of the (1_2)th wing plate 150_2 in the third direction DR3. The second sub-lattice pattern portion SLP_2 may include slits passing through the panel support MP in the third direction DR3. Therefore, the second sub-lattice pattern portion SLP_2 may be readily bent.

In some embodiments, the second adhesive member ADL_2 may be interposed between the second sub-lattice pattern portion SLP_2 and the second rotation area 150_2c so that the second sub-lattice pattern portion SLP_2 and the second rotation area 150_2c may be attached to each other, but embodiments are not limited thereto. For example, the second adhesive member ADL_2 may not be interposed between the second sub-lattice pattern portion SLP_2 and the second rotation area 150_2c to make sure of bending characteristics. Hereinafter, the description will be based on that the second adhesive member ADL_2 is interposed between the second sub-lattice pattern portion SLP_2 and the second rotation area 150_2c so that the second sub-lattice pattern portion SLP_2 and the second rotation area 150_2c are attached to each other. In a state that the jig 100 is folded, the display member 200 may be stably bent toward the outside of the jig 100 along the (1_1)th wing plate 150_1.

The second flat portion MP_2 of the panel support MP may serve to support the second non-bending area NBA_2 of the display member 200. The second flat panel portion MP_2 may overlap the second flat panel plate 130 of the jig 100 in the third direction DR3. The second adhesive member ADL_2 may be interposed between the second flat panel portion MP_2 and the second flat panel plate 130 so that the second flat panel portion MP_2 and the second flat panel plate 130 may be attached to each other.

A width of the first main lattice pattern portion LP1 in the second direction DR2 may occupy most of a width of the first bending area BA1 in the second direction DR2. The width of the first main lattice pattern portion LP1 in the second direction DR2 may be greater than that of the first sub-lattice pattern portion SLP_1 in the second direction DR2 and that of the second sub-lattice pattern portion SLP_2 in the second direction DR2. In some embodiments, the width of the first sub-lattice pattern portion SLP_1 in the second direction DR2 and width of the second sub-lattice pattern portion SLP_2 in the second direction DR2 may be substantially the same as each other, but are not limited thereto.

The width of the first flat panel portion MP_1 in the second direction DR2 may be greater than that of the first sub-flat panel portion SMP_1 in the second direction DR2 and that of the second sub-flat panel portion SMP_2 in the second direction DR2. The width of the second flat panel portion MP_2 in the second direction DR2 may be greater than that of the first sub-flat panel portion SMP_1 in the second direction DR2 and that of the second sub-flat panel portion SMP_2 in the second direction DR2. In some embodiments, the width of the first sub-flat panel portion SMP_1 in the second direction DR2 and the width of the second sub-flat panel portion SMP_2 in the second direction DR2 may be substantially the same as each other, but are not limited thereto.

Hereinafter, a bending profile of the display member 200 in a state that the jig 100 is folded and a side of the display member 200, which is exposed by the panel exposing area RA of the first gear housing GH1, will be described in detail.

FIG. 9 is a schematic perspective view illustrating that the jig for testing a flexible panel and the display member, which are shown in FIG. 6, are folded. FIG. 10 is a schematic side view illustrating that a folded state of the jig for testing a flexible panel and the display member, which are shown in FIG. 6, is viewed in a first direction. FIG. 11 is a schematic cross-sectional view taken along line X4-X4' of FIG. 9. FIG. 12 is an enlarged schematic view illustrating area Q1 of FIG. 9. FIG. 13 is an enlarged schematic view illustrating area Q2 of FIG. 9. FIG. 14 is an enlarged schematic view illustrating area Q3 of FIG. 9. For convenience of description, the shape of the first gear housing is schematically illustrated in FIGS. 11 and 14. Also, for convenience of description, the other elements except the panel support of the display member are omitted from FIG. 14.

Referring to FIGS. 9 to 11, in a state that the jig 100 is folded, the display member 200 may be widened toward the outside of the jig 100 along the (1_1)th wing plate 150_1 and the (1_2)th wing plate 150_2 and bent with a relatively large radius of curvature, and a side of the display member 200 may be exposed in an exposed area defined by the first inclined portion 170_1b of the first gear arm 170_1, the second inclined portion 170_2b of the second gear arm 170_2, and the panel exposing area RA of the first gear housing GH1, so that the side of the display member 200 may be visible to a user.

In a state that the jig 100 is folded, a gap distance in the third direction DR3 between the first gear arm 170_1 and the second gear arm 170_2 may vary along the other side in the second direction DR2. In detail, a gap distance in the third direction DR3 between the first inclined portion 170_1b of the first gear arm 170_1 and the second inclined portion 170_2b of the second gear arm 170_2 may be gradually increased along the other side in the second direction DR2, and a gap distance in the third direction DR3 between the first flat portion 170_1a of the first gear arm 170_1 and the second flat portion 170_2a of the second gear arm 170_2 may be substantially constant along the other side in the second direction DR2. The gap distance in the third direction DR3 between the first flat portion 170_1a of the first gear arm 170_1 and the second flat portion 170_2a of the second gear arm 170_2 may be shorter than the gap distance in the third direction DR3 between the first inclined portion 170_1b of the first gear arm 170_1 and the second inclined portion 170_2b of the second gear arm 170_2. This is caused by a structure in which the first inclined portion 170_1b and the second inclined portion 170_2b are inclined toward the outside of the jig 100 based on the first flat portion 170_1a and the second flat portion 170_2a, respectively.

In a state that the jig 100 is folded, the (1_1)th wing plate 150_1 may rotate toward the outside of the jig 100, for example, one side of the jig 100 in the third direction DR3 based on FIG. 10 through the first rotation shaft RC1. The (1_1)th wing plate 150_1 may overlap the first inclined portion 170_1b of the first gear arm 170_1 in the first direction DR1. In other words, in case that the folded jig 100 is viewed in the first direction DR1, the (1_1)th wing plate 150_1 may not be visible to a user by the first inclined portion 170_1b.

In a state that the jig 100 is folded, the (1_2)th wing plate 150_2 may rotate toward the outside of the jig 100, for example, the other side in the third direction DR3 based on FIG. 10 through the second rotation shaft RC2. The (1_2)th wing plate 150_2 may overlap the second inclined portion 170_2b of the second gear arm 170_2 in the first direction DR1. In other words, in case that the folded jig 100 is viewed in the first direction DR1, the (1_2)th wing plate 150_2 may not be visible to a user by the second inclined portion 170_2b.

Therefore, in ae state that the jig 100 is folded, the (1_1)th wing plate 150_1 may be widened toward one side in the third direction DR3, and the (1_2)th wing plate 150_2 may be widened toward the other side in the third direction DR3. Therefore, in a state that the jig 100 is folded, a gap distance between the (1_1)th wing plate 150_1 and the (1_2)th wing plate 150_2 may be gradually increased along the other side in the second direction DR2.

Referring to FIG. 12, the panel support MP of the display member 200 may be bent in a direction toward the outside of the jig 100 near an area overlapped with the first rotation area 150_1c of the (1_1)th wing plate 150_1. As described above, the first sub-lattice pattern portion SLP_1 of the panel support MP may readily bend the display member 200 in a direction toward the outside of the jig 100.

Referring to FIG. 13, the panel support MP of the display member 200 may be widened toward the outside of the jig 100 near an area overlapped with the (1_1)th area 150_1a of the (1_1)th wing plate 150_1. As described above, the first sub-flat panel portion SMP_1 may be attached to the (1_2)th area 150_1b of the (1_1)th wing plate 150_1 through the second adhesive member ADL_2, so that the display member 200 may be extended in a direction toward the outside of the jig 100.

Referring to FIG. 14, the panel support MP of the display member 200 may be spaced apart from the (1_2)th area 150_1b of the (1_1)th wing plate 150_1 and the (2_2)th area 150_2b of the (1_2)th wing plate 150_2 and bent toward the inside of the jig 100. As described above, since the second adhesive member ADL_2 is not interposed between the first main lattice pattern portion LP1 portion and the (1_2)th area 150_1b of the (1_1)th wing plate 150_1 and the (2_2)th area 150_2b of the (1_2)th wing plate 150_2, the first main lattice pattern portion LP1 may be bent independently of the (1_1)th wing plate 150_1 and the (1_2)th wing plate 150_2.

Since the panel exposing area RA of the first gear housing GH1 is concavely bent in a direction toward the inside of the first gear housing GH1, a side of the first bending area BA1 of the bent display member 200 may be visible to a user. If the panel exposing area RA is not defined in the first gear housing GH1, the side of the first bending area BA1 of the display member 200 is not completely visible so that the bending characteristics of the display member 200 may not be effectively tested. In some embodiments, a curvature of the panel exposing area RA of the first gear housing GH1 may be formed to be the same as that of the first main lattice pattern portion LP1, but embodiments are not limited thereto.

In accordance with the above-described configuration, the jig 100 may form an exposed area near the first hinge part 170 in a folded state. In the exposed area near the first hinge part 170, the side of the display member 200, for example, the surface of the display member 200 in the first direction DR1 may be exposed to be visible to a user. Therefore, the user may readily test the bending characteristics of the display member 200.

Also, in accordance with the above-described configuration, in a state that the jig 100 is folded, the radius of curvature of the display member 200 may be relatively increased as compared with the case that the first gear arm 170_1 and the second gear arm 170_2 are formed in a straight line, whereby stress applied to the display member 200 may be reduced.

Hereinafter, the display device DD that includes the jig 100 according to one embodiment will be described.

FIG. 15 is an exploded schematic perspective view illustrating a display device according to one embodiment. FIG. 16 is a schematic perspective view illustrating the display device according to an embodiment of FIG. 15. FIG. 17 is a schematic perspective view illustrating that the display device according to an embodiment of FIG. 15 is folded.

Referring to FIGS. 15 to 17, the display device DD according to one embodiment may be a device for displaying a moving image or a still image, and may be used as a display screen of various products such as a television, a laptop computer, a monitor, an advertising board, and an Internet of Things device, as well as a portable electronic device such as a mobile phone, a smart phone, a tablet PC, a smart watch, a watch phone, a mobile communication terminal, an electronic diary, an electronic book, a PMP, a navigator, and a UMPC.

The display device DD according to one embodiment may include a first non-folding area NFA_1 and a second non-folding area NFA_2, which may be flat areas, and a first folding area FA1 that may be a bendable area. The first non-folding area NFA_1 of the display device DD may correspond to the first flat panel plate 110 of the jig 100 and the first non-bending area NBA_1 of the display member 200, the second non-folding area NFA_2 of the display device DD may correspond to the second flat panel plate 130 of the jig 100 and the second non-bending area NBA_2 of the display member 200, and the first folding area FA1 of the display device DD may correspond to the first wing plate member 150 of the jig 100 and the first bending area BA1 of the display member 200. As shown in FIG. 17, the display device DD may be a single foldable display device that may be folded (or bent) in the first folding area FA1 based on a first folding axis BX1, but embodiments are not limited thereto.

The display device DD according to one embodiment may include a display area DA for displaying a screen and a non-display area NDA surrounding the display area DA. The non-display area NDA may be an area for not displaying a screen. The display area DA may be defined by the active area AA of the display member 200 as described below.

The display device DD according to one embodiment may include a jig 100 according to an embodiment of FIG. 1. In detail, as shown in FIG. 15, the display device DD according to one embodiment may include a set cover member 300 that covers the side of the display member 200 attached to the upper surface of the jig 100 and the outside of the jig 100. Since the jig 100 and the display member 200 have been described as above, their detailed description will be omitted.

The display device DD according to one embodiment may include a set cover member 300. The set cover member 300 may serve to surround the outside of the jig 100, thereby preventing the jig 100 and the side of the display member 200 disposed on the jig 100 from being visible to a user. In detail, the set cover member 300 may cover an area on the jig 100, in which the display member 200 is not disposed, and the non-active area NAA of the display member 200, so that only the active area AA of the display member 200 is visible to the user. The active area AA of the display member 200 may be the display area DA of the display device DD, and the area on the jig 100, in which the display member 200 is not disposed, and the non-active area NAA of the display member 200 may be the non-display area NDA of the display device DD.

The set cover member 300 may include a first set cover 300_1, a second set cover 300_2, and a hinge cover 300_3. The hinge cover 300_3 may be disposed between the first set cover 300_1 and the second set cover 300_2.

The first set cover 300_1 may serve to cover the first flat panel plate 110 of the jig 100, the first gear arm 170_1, the side of the first non-bending area NBA_1 of the display member 200, and the non-active area NAA passing through the first non-bending area NBA_1. Therefore, the first flat panel plate 110 of the jig 100, the first gear arm 170_1, and the non-active area NAA passing through the first non-bending area NBA_1 of the display member 200 may not be visible to the user.

The second set cover 300_2 may cover the second flat panel plate 130 of the jig 100, the second gear arm 170_2, the side of the second non-bending area NBA_2 of the display member 200, and the non-active area NAA passing through the second non-bending area NBA_2. Therefore, the second flat panel plate 130 of the jig 100, the second gear arm 170_2, and the non-active area NAA passing through the second non-bending area NBA_2 of the display member 200 may not be visible to the user.

The hinge cover 300_3 may cover a hinge member of the jig 100, the first wing plate member 150, the side of the first bending area BA1 of the display member 200 and the non-active area NAA passing through the first bending area BA1. Therefore, the hinge member of the jig 100, the first wing plate member 150, and the non-active area NAA passing through the first bending area BA1 of the display member 200 may not be visible to the user.

In accordance with the above-described configuration, the display device DD according to one embodiment may improve reliability in bending characteristics of the display device DD by selectively assembling the display member 200 having bending characteristics. In more detail, before the set cover member 300 is mounted, the jig 100 and the display member 200 may be subjected to folding behavior to readily test the bending characteristics of the display member 200 as described above. In case that there is no problem, the set cover member 300 may be mounted on a jig assembly that includes the jig 100 and the display member 200 attached to the upper surface of the jig 100, whereby the display device DD having the bending characteristics may be obtained. In case that there is a problem, such a display member 200 having a defect in the bending characteristics may be identified before a display device is manufactured. As a result, reliability in the bending characteristics of display devices DD may be improved.

Hereinafter, other embodiments of the jig 100 for testing a flexible panel and the display device DD will be described. In the following embodiments, the same elements as those in the above-described embodiments will be referred to as the same reference numerals, their repeated description will be omitted, and the description will be based on one or more differences from the above-described embodiments.

FIG. 18 is a schematic perspective view illustrating a structure of a jig for testing a flexible panel according to another embodiment. FIG. 19 is a schematic side view illustrating that the jig for testing a flexible panel according to an embodiment of FIG. 18 is viewed in a first direction. FIG. 20 is a schematic cross-sectional view taken along line X5-X5' of FIG. 18. FIG. 21 is a schematic structural view illustrating a first dumbbell and a second dumbbell are disposed in a state that the jig for testing a flexible panel according to an embodiment of FIG. 18 is folded.

Referring to FIGS. 18 to 21, in the jig 101 according to an embodiment, dumbbells and grooves may be alternately disposed on a first flat portion 171_1a of the first gear arm 171_1 and a second flat portion 171_2a of the second gear arm 171_2, respectively. In detail, in case that the jig 101 is folded, the dumbbells on the first flat portion 171_1a may be engaged with the grooves on the second flat portion 171_2a, and the dumbbells on the second flat portion 171_2a may be disposed to be engaged with the grooves on the first flat portion 171_1a.

First dumbbells DB1 may be disposed on the first flat portion 171_1a. Although two first dumbbells DB1 are shown, it will be apparent that the number of the first dumbbells DB1 is not limited thereto. The first dumbbells DB1 may be spaced apart from each other in the second direction DR2 on the first flat portion 171_1a. A gap distance between the first dumbbells DB1 may be substantially the same as a width of the first dumbbell DB1 in the second direction DR2. First grooves H1 may be disposed in the gap space between the first dumbbells DB1 as spaces concavely recessed from the first flat portion 171_1a toward the other side in the third direction DR3. In case that the jig 101 is folded as described below, the first grooves H1 may be spaces in which the second dumbbells DB2 are accommodated. The first dumbbells DB1 and the first grooves H1 may be alternately disposed. In some embodiments, the first dumbbells DB1 may be disposed to be spaced apart from each other in the second direction DR2 from one end of the first flat panel portion MP_1 in the second direction DR2, and the first grooves H1 may be disposed to be spaced apart from each other in the second direction DR2 from the other end of the first flat panel portion MP_1 in the second direction DR2, but the dumbbells and the grooves are not limited thereto.

Second dumbbells DB2 may be disposed on the second flat portion 171_2a. Although two second dumbbells DB2 are shown, it will be apparent that the number of the second dumbbells DB2 is not limited thereto. The second dumbbells DB2 may be spaced apart from each other in the second direction DR2 on the second flat portion 171_2a. A gap distance between the second dumbbells DB2 may be substantially the same as a width of the second dumbbell DB1 in the second direction DR2. Second grooves H2 may be disposed in the gap space between the second dumbbells DB2 as spaces concavely recessed from the second flat portion 171_2a toward the other side in the third direction DR3. In case that the jig 101 is folded as described below, the second grooves H2 may be spaces in which the first dumbbells DB1 are accommodated. The second dumbbells DB2 and the second grooves H2 may be alternately disposed. In some embodiments, the second grooves H2 may be disposed to be spaced apart from each other in the second direction DR2 from one end of the second flat panel portion MP_2 in the second direction DR2, and the second dumbbells DB2 may be disposed to be spaced apart from each other in the second direction DR2 from the other end of the second flat panel portion MP_2 in the second direction DR2, but the grooves and the dumbbells are not limited thereto.

In case that the jig 101 according to an embodiment is folded by the above-described configuration, as shown in FIG. 21, each of the first dumbbells DB1 disposed on the first flat portion 171_1a may be accommodated in each of the second grooves H2 disposed on the second flat portion 171_2a, and each of the second dumbbells DB2 disposed on the second flat portion 171_2a may be accommodated in each of the first grooves H1 disposed on the first flat portion 171_1a. Therefore, the jig 101 according to an embodiment may stably maintain the folded state.

FIG. 22 is a schematic perspective view illustrating a structure of a jig for testing a flexible panel according to still another embodiment.

Referring to FIG. 22, a jig 102 according to an embodiment of FIG. 22 may have multiple hinge parts. In detail, the jig 102 according to an embodiment may further include a third flat panel plate 142 disposed on one side of the second flat panel plate 130 in the second direction DR2, and a second hinge part 182 disposed between the second flat panel plate 130 and the third flat panel plate 142. Since the first flat panel plate 110, the second flat panel plate 130, and the first hinge part 170 of the jig 102 according to an embodiment may be substantially the same as or similar to the description of the jig 100 according to an embodiment of FIG. 1, their detailed description will be omitted. The third flat panel plate 142 may be referred to as a third flat panel frame.

The third flat panel plate 142 may have a flat panel shape, and may overlap a third non-bending area of the display member 200 as described below. Since the third flat panel plate 142 may be substantially the same as or similar to the detailed description of the first flat panel plate 110 and the second flat panel plate 130, its detailed description will be omitted.

The second hinge part 182 may be disposed at both ends of the jig 100 in the first direction DR1 between the second flat panel plate 130 and the third flat panel plate 142 to connect both ends of the second flat panel plate 130 in the first direction DR1 with both ends of the third flat panel plate 142 in the first direction DR1. Therefore, the second hinge part 182 may be spaced apart from another second hinge part in the first direction DR1 to define a gap space therebetween.

The second hinge part 182 may include a third gear arm 182_1, a fourth gear arm 182_2, and a second gear portion GP2, and the second gear portion GP2 may include a third gear pin, a fourth gear pin, and a second gear housing. Since the configuration of the second hinge part 182 may be substantially the same as or similar to that of the first hinge part 170 of the jig 100 according to an embodiment of FIG. 1, its detailed description will be omitted.

A second wing plate member 162 may serve to support a second bending area BA2 (see FIG. 25) of a display member 202 (see FIG. 25) in a state that the jig 102 is unfolded, and may freely move a second bending area BA2 (see FIG. 25) of the display member in a state that the jig 102 is folded. The second wing plate member 162 may be disposed in a gap space between the second flat panel plate 130 and the third flat panel plate 142.

An upper surface of the second wing plate member 162 may form a non-bent surface with an upper surface of the second flat panel plate 130 and an upper surface of the third flat panel plate 142 in a state that the jig 100 is unfolded. In other words, the upper surface of the second wing plate member 162, the upper surface of the second flat panel plate 130, and the upper surface of the third flat panel plate 142 may be disposed on one plane.

The second wing plate member 162 may include a (2_1)th wing plate 162_1 connected to the second flat panel plate 130, and a (2_2)th wing plate 162_2 connected to the third flat panel plate 142.

The (2_1)th wing plate 162_1 and the (2_2)th wing plate 162_2 may have a rectangular planar shape having a long side in the first direction DR1 and a short side in the second direction DR2.

In accordance with the above-described configuration, in case that there are multiple bending areas of the display member, bending characteristics of each of the bending areas may be readily tested.

FIG. 23 is a schematic perspective view illustrating a structure of a jig for testing a flexible panel according to further still another embodiment. FIG. 24 is a schematic side view illustrating that the jig for testing a flexible panel according to an embodiment of FIG. 23 is viewed in a first direction. FIG. 25 is a schematic perspective view illustrating that a display member is disposed on the jig for testing a flexible panel according to an embodiment of FIG. 23. FIG. 26 is a schematic cross-sectional view taken along line X6-X6' of FIG. 25. FIG. 27 is a schematic side view illustrating that a folded state of the jig for testing a flexible panel and the display member, which are shown in FIG. 23, is viewed in a first direction;

Referring to FIGS. 23 and 24, a jig 103 according to an embodiment may be different from the jig 102 according to an embodiment of FIG. 22 at least in that a shape of a third gear arm 183_1 and a fourth gear arm 183_2 of the second hinge part 183 may be flat, and its other configuration may be substantially the same or similar to that of the jig 102 according to an embodiment of FIG. 22. Hereinafter, the description will be based on one or more differences from the jig 102 according to an embodiment of FIG. 22.

The second hinge part 183 according to an embodiment may include a third gear arm 183_1, a fourth gear arm 183_2, and a second gear portion GP2.

The third gear arm 183_1 of the second hinge part 183 may be attached to the second flat panel plate 130 to guide the folding behavior of the second flat panel plate 130. The third gear arm 183_1 may have a generally flat structure, and may not have an inclined structure. The third gear arm 183_1 may be accommodated in the second gear housing of the second gear portion GP3.

The fourth gear arm 183_2 of the second hinge part 183 may be attached to the third flat panel plate 142 to guide the folding behavior of the third flat panel plate 142. The fourth gear arm 183_2 may have a generally flat structure, and may not have an inclined structure. The fourth gear arm 183_2 may be accommodated in the second gear housing of the second gear portion GP2.

The second gear portion GP3 of the second hinge part 183 may engage the third gear arm 183_1 and the fourth gear arm 183_2 to be engaged with each other, thereby controlling the operation of the third gear arm 183_1 and the fourth gear arm 183_2. The second gear portion GP3 may include a second gear housing GH3, a third gear pin G3, and a fourth gear pin G4.

The second gear housing GH3 may form an external appearance of the second gear portion GP2, and may serve to protect various members disposed thereinside from the outside. In some embodiments, the second gear housing GH3 may not expose a side of the flexible panel. In other words, the panel exposing area RA may not be defined in the second gear housing GH3, unlike the first gear housing GH1.

Referring to FIGS. 25 to 27, a display member 202 in which multiple bending areas are defined may be disposed on the jig 103 according to an embodiment. In detail, the display member 202 may further include a third non-bending area NBA_3 disposed at one side of the second non-bending area NBA_2 in the second direction DR2 and a second bending area BA2 disposed between the second non-bending area NBA_2 and the third non-bending area NBA_3. A width of the first bending area BA1 of the display member 202 in the second direction DR2 may be smaller than that of the second bending area BA2 in the second direction DR2. This may be by a folding method of the jig 103 as described below.

The third non-bending area NBA_3 of the display member 202 may overlap the third flat panel plate 142 in the third direction DR3, and the second bending area BA2 may overlap the second wing plate member 162 in the third direction DR3.

The panel support MP of the display member 202 may further include a third flat portion MP_3 disposed at one side of the second flat panel portion MP_2 in the second direction DR2, and a second main lattice pattern portion LP2 disposed between the second flat portion MP_2 and the third flat portion MP_3. A width of the first main lattice pattern portion LP1 in the second direction DR2 may be smaller than that of the second main lattice pattern portion LP2 in the second direction DR2. This may be by a folding method of the jig 103 as described below.

The third flat portion MP_3 of the panel support MP may be disposed on the third flat panel plate 142, and may be attached to the third flat panel plate 142 by the second adhesive member ADL_2 interposed between the third flat panel plate MP_3 and the third flat panel plate 142.

The second main lattice pattern portion LP2 of the panel support MP may serve to readily bend the display member 200 in the second bending area BA2. The second main lattice pattern portion LP2 may overlap the second wing plate member 162 in the third direction DR3. The second wing plate 162 may include a (2_1)th wing plate 162_1 connected to the second flat panel plate 130, and a (2_2)th wing plate 162_2 connected to the third flat panel plate 142.

The (2_1)th wing plate 162_1 may include a first rotation area 162_1c and a first support area 162_1a.

In case that the jig 103 is folded, the first rotation area 162_1c may serve to rotate the first wing plate 162_1 toward the outside of the jig 103. The first rotation area 162_1c may be an area through which a third rotation shaft RC3 extended in the first direction DR1 passes. The third rotation shaft RC3 may have a cylindrical shape. Since a structure in which the first rotation area 162_1c and the third rotation shaft RC3 are connected to each other may be substantially the same as the connection structure between the first rotation shaft RC1 and the first rotation area 150_1c of the (1_1)th wing plate 150_1, its description will be omitted (see FIG. 5).

The first support area 162_1a may occupy most of the (1_1)th wing plate 162_1, and may serve to support second main lattice pattern portion LP2.

The (2_2)th wing plate 162_2 may include a second rotation area 162_2c and a second support area 162_2a.

In case that the jig 103 is folded, the second rotation area 162_2c may serve to rotate the second wing plate 162_2 toward the outside of the jig 103. The second rotation area 162_2c may be an area through which a fourth rotation shaft RC4 extended in the first direction DR1 passes. The fourth rotation shaft RC4 may have a cylindrical shape. Since a structure in which the second rotation area 162_2c and the fourth rotation shaft RC4 are connected to each other may be substantially the same as the connection structure between the second rotation shaft RC2 and the second rotation area 150_2c of the (1_2)th wing plate 150_2, its description will be omitted (see FIG. 5).

The second support area 162_2a occupies most of the (1_2)th wing plate 162_2, and may serve to support the second main lattice pattern portion LP2.

The second main lattice pattern portion LP2 may include slits passing through the panel support MP in the third direction DR3. Therefore, the second main lattice pattern portion LP2 may be readily bent.

The second main lattice pattern portion LP2 may overlap the second bending area BA2. The second bending area BA2 may be defined by the second main lattice pattern portion LP2. In other words, the other elements other than the second main lattice pattern portion LP2 may not be disposed in the second bending area BA2 of the panel support MP.

A separate adhesive member may not be interposed between the second main lattice pattern portion LP2 and the second wing plate member 162 so that the second main lattice pattern portion LP2 and the second wing plate member 162 may be spaced apart from each other in the third direction DR3. Therefore, the second main lattice pattern portion LP2 and the second wing plate member 162 may be independently behaved.

In case that the first flat panel plate 110, the second flat panel plate 130 and the third flat panel plate 142 of the jig 103 according to the disclosure are all folded, the upper surface of the first flat panel plate 110 and the upper surface of the second flat panel plate 130 may face each other, and the bottom surface of the first flat panel plate 110 and the upper surface of the third flat panel plate 142 may face each other. This may be due to the width of the second bending area BA2 of the display member 202 in the second direction, which is greater than the width of the first bending area BA1 in the second direction DR2. Therefore, the gap distance between the first flat panel plate 110 and the second flat panel plate 130 in the third direction DR3 may be smaller than that between the second flat panel plate 130 and the third flat panel plate 142 in the third direction DR3.

The second bending area BA2 may be bent with a relatively large radius of curvature as compared with the first bending area BA1, so that stress applied to the second bending area BA2 may be relatively smaller than the first bending area BA. Therefore, in case that the second flat panel plate 130 and the third flat panel plate 142 of the jig 103 according to the disclosure are folded, the second bending area BA2 may be entirely bent toward the inner side of the jig 103 without being required to be partially bent toward the outside of the jig 103. In other words, the jig 103 according to an embodiment may be in-folded by rotation movement of the first gear arm 170_1 and the second gear arm 170_2 in the first bending area BA1, and may be in-folded by rotation movement of the third gear arm 184_1 and the fourth gear arm 184_2 in the second bending area BA2.

Since the second bending area BA2 may be bent with a relatively large radius of curvature as compared with the first bending area BA1, stress applied to the second bending area BA2 may be relatively smaller than that of the first bending area BA1, so that a defect in bending characteristics may hardly occur in the second bending area BA2. Therefore, the need to test the bending characteristics of the second bending area BA2 may be relatively reduced.

Therefore, in case that the second flat panel plate 130 and the third flat panel plate 142 of the jig 100 according to an embodiment are folded in accordance with the configuration of the second gear housing GH3 as described above, the side of the second bending area BA2 of the display member 200 may not be exposed.

The shape of the third gear arm 182_1 and the fourth gear arm 182_2 may be simplified by the above-described configuration, and the shape of the second gear housing GH3 may be simplified so that a separate panel exposing area RA is not formed in the second gear housing GH3.

FIG. 28 is a schematic perspective view illustrating that a display member is disposed on the jig for testing a flexible panel according to another embodiment. FIG. 29 is a schematic side view illustrating that a folded state of the jig for testing a flexible panel and the display member, which are shown in FIG. 28, is viewed in a first direction.

Referring to FIGS. 28 and 29, the jig 104 according to an embodiment may be different from the jig 103 according to an embodiment of FIG. 23 at least in that a second gear portion GP4, the third gear arm 182_1, and the fourth gear arm 184_2 may be disposed to be reversed, and the other configurations may be substantially the same as or similar to those according to an embodiment of FIG. 23. Hereinafter, the description will be based on one or more differences between from the jig 103 according to an embodiment of FIG. 23.

The third gear arm 184_1 and the fourth gear arm 184_2 may be accommodated in a second gear housing GH4 of the second gear portion GP4. The third gear arm 184_1 may be rotated by the third gear pin G3 of the second gear portion GP4, and the fourth gear arm 184_2 may be rotated by the fourth gear pin G4 of the second gear portion GP4.

The jig 104 according to an embodiment may be folded outward, for example, out-folded by rotation movement of the third gear arm 184_1 and the fourth gear arm 184_2. In other words, the jig 104 according to an embodiment may be in-folded by rotation movement of the first gear arm 170_1 and the second gear arm 170_2 in the first bending area BA1, and may be out-folded by rotation movement of the third gear arm 184_1 and the fourth gear arm 184_2 in the second bending area BA2.

In some embodiments, the second wing plate member 162 of the jig 103 according to an embodiment of FIG. 23 may be omitted from the jig 104 according to an embodiment, but embodiments are not limited thereto.

FIG. 30 is a schematic perspective view illustrating a display device according to another embodiment. FIG. 31 is a schematic perspective view illustrating that the display device according to an embodiment of FIG. 30 is folded. FIG. 32 is a schematic perspective view illustrating that the display device according to an embodiment of FIG. 30 is folded.

A display device DD2 according to an embodiment may include the jig 102 according to an embodiment of FIG. 22, the jig 103 according to an embodiment of FIG. 23, or the jig 104 according to an embodiment of FIG. 28. In detail, the display device DD2 according to an embodiment may be folded based on folding axes BX1 and BX2.

The display device DD2 according to an embodiment may further include a third non-folding area NFA_3 disposed on one side of the second non-folding area NFA_2 in the second direction DR2, and a second folding area FA2 disposed between the second non-folding area NFA_2 and the third non-folding area NFA_3. The second folding area FA2 may be folded (or bent) based on the second folding axis BX2. A radius of curvature R1 in which the first folding area FA1 is bent may be smaller than a radius of curvature R2 in which the second folding area FA2 is bent.

As shown in FIG. 31, the display device DD2 according to an embodiment may be folded so that the bottom surface of the first non-folding area NFA_1 and the upper surface of the third non-folding area NFA_3 may face each other. The display device DD2 according to an embodiment may include the jig 102 according to an embodiment of FIG. 22 or the jig 103 according to an embodiment of FIG. 23.

As shown in FIG. 32, the display device DD2 according to an embodiment may be folded so that the bottom surface of the third non-folding area NFA_3 faces the bottom surface of the second non-folding area NFA2. The display device DD2 according to an embodiment may include a jig 104 according to an embodiment of FIG. 28.

In concluding the detailed description, those skilled in the art will appreciate that many variations and modifications can be made to the embodiments without substantially departing from the principles of the disclosure. Therefore, the disclosed embodiments of the disclosure are used in a generic and descriptive sense only and not for purposes of limitation.

What is claimed is:

1. A jig for testing a flexible panel, disposed on a bottom surface of a display member to test bending characteristics of the display member, the jig comprising:
    a first flat panel frame;
    a second flat panel frame disposed on a side of the first flat panel frame; and
    a first hinge part disposed between the first flat panel frame and the second flat panel frame to allow the first flat panel frame and the second flat panel frame to be subjected to folding, wherein
    the first hinge part includes:
        a first gear arm attached to the first flat panel frame;
        a second gear arm directly engaged with the first gear arm and attached to the second flat panel frame, the second gear arm being collinear with the first gear arm when the jig is unfolded;
    a first gear housing covering at least a portion of the first gear arm and at least a portion of the second gear arm, the first gear housing including a concave surface bent toward an inside of the first gear housing; and
    a panel exposing area defined at least in part by the concave surface, and
    in case that the first flat panel frame and the second flat panel frame are folded, the panel exposing area of the first gear housing exposes a side of the display member.

2. The jig of claim 1, wherein
the display member includes a display panel that displays a screen, and the display panel includes:
    a first non-bending area disposed on the first flat panel frame;
    a second non-bending area disposed on the second flat panel frame; and
    a first bending area disposed between the first non-bending area and the second non-bending area, and
in case that the first flat panel frame and the second flat panel frame are folded, the panel exposing area of the first gear housing exposes the first bending area of the display panel.

3. The jig of claim 2, wherein
the display member further includes a panel support disposed on a bottom surface of the display panel,
the panel support includes:
    a first flat panel portion that overlaps the first non-bending area of the display panel;
    a second flat panel portion that overlaps the second non-bending area; and
    a first main lattice pattern portion that overlaps the first bending area of the display panel, and
in case that the first flat panel frame and the second flat panel frame are folded, the panel exposure area of the first gear housing exposes the first main lattice pattern portion of the panel support.

4. The jig of claim 1, wherein the first gear arm includes:

a first flat portion attached to an upper surface of the first flat panel frame;

a first inclined portion disposed on a side of the first flat portion and inclined toward a bottom surface of the first flat panel frame based on the first flat portion; and a first sawtooth portion disposed on one side of the first inclined portion and accommodated in the first gear housing, the second gear arm includes:

a second flat portion attached to an upper surface of the second flat panel frame;

a second inclined portion disposed on one side of the second flat portion and inclined toward a bottom surface of the second flat panel frame based on the second flat portion; and a second sawtooth portion disposed on one side of the second inclined portion and accommodated in the first gear housing, and the first sawtooth portion and the second sawtooth portion are engaged with each other inside the first gear housing.

5. The jig of claim 4, wherein, in case that the first flat panel frame and the second flat panel frame are folded, a gap distance between the first inclined portion of the first gear arm and the second inclined portion of the second gear arm is greater than a gap distance between the first flat portion of the first gear arm and the second flat portion of the second gear arm.

6. The jig of claim 5, wherein, in case that the first flat panel frame and the second flat panel frame are folded, the gap distance between the first inclined portion of the first gear arm and the second inclined portion of the second gear arm is increased in a direction toward the first gear housing.

7. The jig of claim 4, wherein the first gear arm includes first dumbbells each having a first base and a first head at one end of the first base, the first head protruding radially outward relative to the first base, and the first base of each of the first dumbbells being disposed on the first flat portion such that the first dumbbells are spaced apart from each other, and the second gear arm includes second dumbbells each having a second base and a second head at one end of the second base, the second head protruding radially outward relative to the second base, and the second base of each of the second dumbbells being disposed on the second flat portion such that the second dumbbells are spaced apart from each other.

8. The jig of claim 7, wherein first grooves concavely recessed in a thickness direction of the first flat portion are defined in the first flat portion as gap spaces of the first dumbbells, and second grooves concavely recessed in a thickness direction of the second flat portion are defined in the second flat portion as gap spaces of the second dumbbells.

9. The jig of claim 8, wherein in case that the first flat panel frame and the second flat panel frame are folded, each of the first heads of the first dumbbells is accommodated in one second groove of the second grooves, and each of the second heads of the second dumbbells is accommodated in one first groove of the first grooves.

10. The jig of claim 1, further comprising:

a third flat panel frame disposed on an opposite side of the first flat panel frame with the second flat panel frame interposed therebetween; and a second hinge part disposed between the second flat panel frame and the third flat panel frame to allow the second flat panel frame and the third flat panel frame to be subjected to folding, wherein the second hinge part includes:

a third gear arm attached to the second flat panel frame;

a fourth gear arm engaged with the third gear arm and attached to the third flat panel frame; and a second gear housing covering at least a portion of the third gear arm and at least a portion of the fourth gear arm.

11. The jig of claim 10, wherein the panel exposing area is a first panel exposing area and the second hinge part further comprises a second panel exposing area defined at least in part by a concave surface of the second gear housing that is bent toward an inside of the second gear housing, and in case that the second flat panel frame and the third flat panel frame are folded, the second panel exposing area of the second gear housing exposes a side of the display member.

12. The jig of claim 11, wherein the second gear housing covers the side of the display member in case that the second flat panel frame and the third flat panel frame are folded, and a gap distance between the first flat panel frame and the second flat panel frame in case that the first flat panel frame and the second flat panel frame are folded is smaller than a gap distance between the second flat panel frame and the third flat panel frame in case that the second flat panel frame and the third flat panel frame are folded.

13. A display device comprising:

a display member;

a jig supporting a bottom surface of the display member, folded in a first direction; and a set cover member covering the display member and the jig so that a side of the display member and the jig are not visible from outside, wherein the jig includes:

a first flat panel frame;

a second flat panel frame disposed to be spaced apart from the first flat panel frame on a side of the first flat panel frame in the first direction; and a hinge part disposed between an end of the first flat panel frame in a second direction crossing the first direction and an end of the second flat panel frame in the second direction to allow the first flat panel frame and the second flat panel frame to be subjected to folding, the hinge part includes:

a first gear arm attached to the first flat panel frame;

a second gear arm directly engaged with the first gear arm and attached to the second flat panel frame, the second gear arm being collinear with the first gear arm when the jig is unfolded; and a gear housing covering at least a portion of the first gear arm and at least a portion of the second gear arm, the gear housing including a concave surface bent toward an inside of the gear housing; and a panel exposing area defined at least in part by the concave surface, and the jig exposes the side of the display member through the panel exposing area in case that the first flat panel frame and the second flat panel frame are folded.

14. The display device of claim 13, further comprising:

a wing plate member disposed in a gap space between the first flat panel frame and the second flat panel frame, wherein the wing plate member includes:

a first wing plate connected to the first flat panel frame through a first rotation shaft passing through the first flat panel frame; and a second wing plate connected to the second flat panel frame through a second rotation shaft passing through the second flat panel frame, and in case that the first flat panel frame and the second flat panel frame are folded, the first wing plate and the second wing plate are widened so that a gap space between the first wing plate and the second wing plate is increased in a direction toward the gear housing.

15. The display device of claim 14, wherein the display member includes:

a display panel that displays a screen; and a metal support disposed on a bottom surface of the display panel, the metal support includes:

a first flat panel portion disposed on the first flat panel frame;

a first main lattice pattern portion disposed on the wing plate member; and a second flat panel portion disposed on the second flat panel frame, the first flat panel portion is attached to the first flat panel frame through an adhesive member, the second flat panel portion is attached to the second flat panel frame through an adhesive member, and the first main lattice pattern portion is spaced apart from the wing plate member.

16. The display device of claim 15, wherein the metal support of the display member further includes:

a first sub-lattice pattern portion disposed between the first flat panel portion and the first main lattice pattern portion; and a first sub-flat panel portion disposed between the first sub-lattice pattern portion and the first main lattice pattern portion, the first wing plate includes:

a first rotation area through which the first rotation shaft passes;

a first area that overlaps the first sub-flat panel portion; and a second area that overlaps the first main lattice pattern portion, the first sub-lattice pattern portion overlaps the first rotation area and is attached to the first rotation area through an adhesive member, the first sub-flat panel portion is attached to the first area through an adhesive member, and the first main lattice pattern portion is spaced apart from the second area.

17. The display device of claim 16, wherein the metal support of the display member includes:

a second sub-lattice pattern portion disposed between the second flat panel portion and the first main lattice pattern portion; and a second sub-flat panel portion disposed between the second sub-lattice pattern portion and the first main lattice pattern portion, the second wing plate includes:

a second rotation area through which the second rotation shaft passes;

a third area that overlaps the second sub-flat panel portion; and a fourth area that overlaps the first main lattice pattern portion, the second sub-lattice pattern portion overlaps the second rotation area, and is attached to the second rotation area through an adhesive member, the second sub-flat panel portion is attached to the third area through an adhesive member, and the first main lattice pattern portion is spaced apart from the fourth area.

18. The display device of claim 17, wherein a width of the first sub-lattice pattern portion and a width of the second sub-lattice pattern portion are smaller than a width of the first main lattice pattern portion, a width of the first sub-flat panel portion is smaller than a width of the first flat panel portion, and a width of the second sub-flat panel portion is smaller than a width of the second flat panel portion.

19. The display device of claim 18, wherein the width of the first sub-lattice pattern portion and the width of the second sub-lattice pattern portion are substantially the same as each other, and the width of the first sub-flat panel portion and the width of the second sub-flat panel portion are substantially the same as each other.

20. The display device of claim 17, wherein, in case that the first flat panel frame and the second flat panel frame are folded, the first sub-lattice pattern portion and the second sub-lattice pattern portion are bent in a direction toward outside of the jig, and the first main lattice pattern portion is bent in a direction toward inside of the jig.

* * * * *